(12) United States Patent
Marica

(10) Patent No.: US 12,006,932 B2
(45) Date of Patent: Jun. 11, 2024

(54) CONNECTORS FOR PUMPING ASSEMBLIES AND METHODS RELATING THERETO

(71) Applicant: National Oilwell Varco, L.P., Houston, TX (US)

(72) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 564 days.

(21) Appl. No.: 17/281,702

(22) PCT Filed: Oct. 2, 2019

(86) PCT No.: PCT/US2019/054191
§ 371 (c)(1),
(2) Date: Mar. 31, 2021

(87) PCT Pub. No.: WO2020/076569
PCT Pub. Date: Apr. 16, 2020

(65) Prior Publication Data
US 2022/0018385 A1    Jan. 20, 2022

Related U.S. Application Data

(60) Provisional application No. 62/745,124, filed on Oct. 12, 2018.

(51) Int. Cl.
*F04B 53/22* (2006.01)
*F04B 23/04* (2006.01)
(Continued)

(52) U.S. Cl.
CPC .............. *F04B 53/22* (2013.01); *F04B 23/04* (2013.01); *F16M 5/00* (2013.01); *F16M 7/00* (2013.01);
(Continued)

(58) Field of Classification Search
CPC .. F04B 53/22; F04B 23/04; F04B 9/02; F04B 15/02; F04B 17/03; F16M 5/00; F16C 7/00
(Continued)

(56) References Cited

U.S. PATENT DOCUMENTS 5,584,464 A   12/1996   Whittaker
7,220,119 B1   5/2007   Kirchmer et al.
(Continued)

FOREIGN PATENT DOCUMENTS

CN   202493417 U   10/2012
CN   107615930 A   1/2018
(Continued)

OTHER PUBLICATIONS

International Patent Application No. PCT/US2019-054191 International Search Report and Written Opinion dated Jan. 3, 2020 (13 pages).
(Continued)

*Primary Examiner* — Charles G Freay
(74) *Attorney, Agent, or Firm* — Conley Rose, P.C.

(57) ABSTRACT

Pump assemblies, pumping systems including said pump assemblies, and related methods are disclosed. In an embodiment, the pump assembly includes a frame, a fluid end, and a power end coupled to the frame and the fluid end. In addition, the pump assembly includes a plurality of connectors coupled between the fluid end and the frame. Each of the connectors include an axis, a first connector member, and a second connector member. The first connector member is configured to actuate relative to the second connector member to adjust a total axial length of the connector along the axis.

20 Claims, 15 Drawing Sheets

(51) Int. Cl.
  *F16M 5/00* (2006.01)
  *F16M 7/00* (2006.01)
  *F04B 9/02* (2006.01)
  *F04B 15/02* (2006.01)
  *F04B 17/03* (2006.01)
(52) U.S. Cl.
  CPC .............. *F04B 9/02* (2013.01); *F04B 15/02* (2013.01); *F04B 17/03* (2013.01)
(58) Field of Classification Search
  USPC ........................................................ 417/359
  See application file for complete search history.

(56) References Cited

U.S. PATENT DOCUMENTS

| | | | | |
|---|---|---|---|---|
| 8,025,487 | B1* | 9/2011 | Paul, III | F04B 1/053 |
| | | | | 92/141 |
| 8,276,859 | B1* | 10/2012 | Caddell | F16M 7/00 |
| | | | | 248/656 |
| 8,511,637 | B2* | 8/2013 | Mitsch | F01D 25/28 |
| | | | | 248/677 |
| 9,810,220 | B2* | 11/2017 | Ghaisas | F04D 1/00 |
| 2006/0022180 | A1 | 2/2006 | Selness | |
| 2007/0066406 | A1 | 3/2007 | Keller et al. | |
| 2015/0159647 | A1* | 6/2015 | Dille | F04B 53/144 |
| | | | | 92/169.1 |
| 2017/0335842 | A1 | 11/2017 | Robinson et al. | |

FOREIGN PATENT DOCUMENTS

| | | | |
|---|---|---|---|
| WO | | 2017/123656 A2 | 7/2017 |
| WO | WO | 2017/123656 A2 * | 7/2017 |

OTHER PUBLICATIONS

U.K. IPO Search Report dated Feb. 13, 2023, for Application No. GB 2218383.4.

* cited by examiner

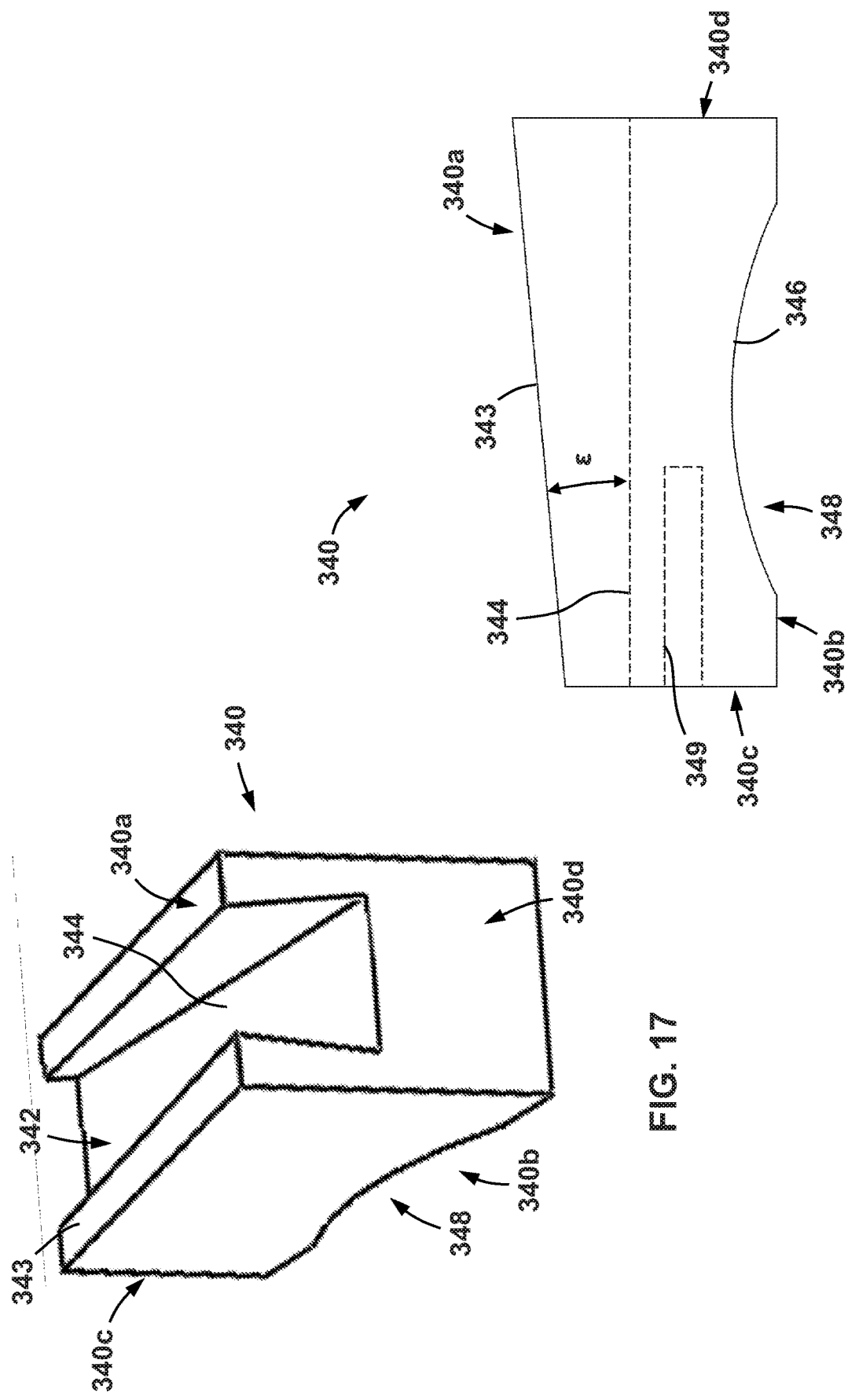

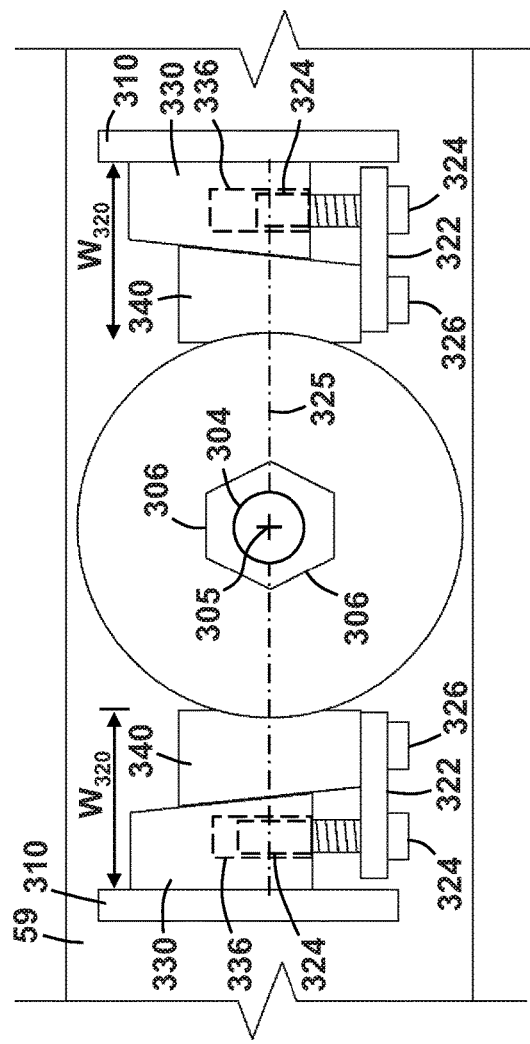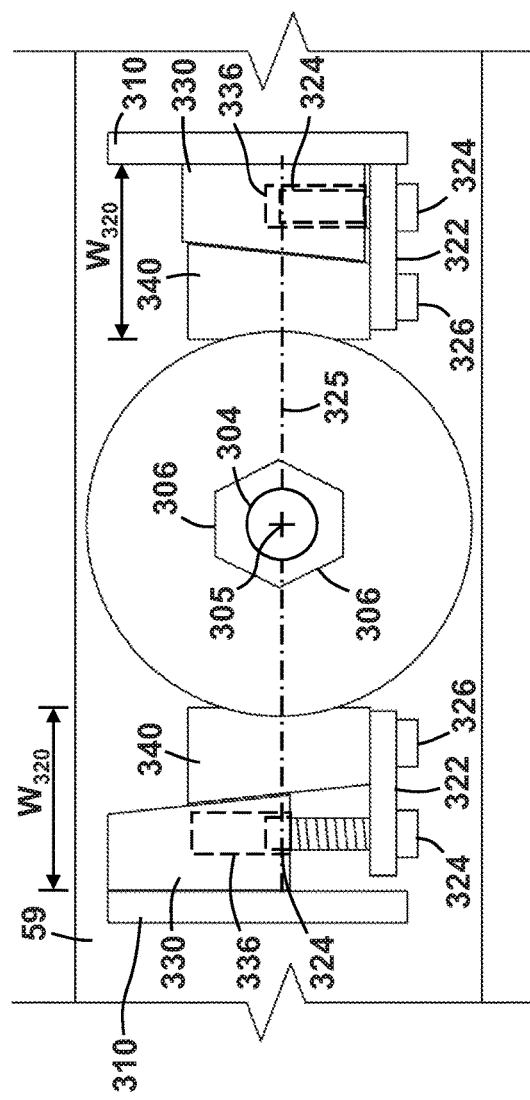

CONNECTORS FOR PUMPING ASSEMBLIES AND METHODS RELATING THERETO

CROSS-REFERENCE TO RELATED APPLICATIONS

This application a National Phase Entry into the U.S. under 35 U.S.C. § 371 of and claims priority to PCT Application No. PCT/US2019/054191, filed Oct. 2, 2019, entitled "Connectors for Pumping Assemblies and Methods Relating Thereto." which claims benefit of U.S. provisional patent application Ser. No. 62/745,124 filed Oct. 12, 2018, and entitled "Connectors for Pumping Assemblies and Methods Relating Thereto," the entire contents of each being incorporated herein by reference for all purposes.

STATEMENT REGARDING FEDERALLY SPONSORED RESEARCH OR DEVELOPMENT

Not applicable.

BACKGROUND

This disclosure relates generally to systems for pressurizing a working fluid. More particularly, some embodiments of this disclosure relate to pumping systems that include one or more direct drive pump assemblies for pressurizing a working fluid for subsequent injection into a subterranean wellbore.

To form an oil or gas well, a bottom hole assembly (BHA), including a drill bit, is coupled to a length of drill pipe to form a drill string. The drill string is then inserted downhole, where drilling commences. During drilling, fluid (or "drilling mud") is circulated down through the drill string to lubricate and cool the drill bit as well as to provide a vehicle for removal of drill cuttings from the borehole. After exiting the bit, the drilling fluid returns to the surface through an annulus formed between the drill string and the surrounding borehole wall (or a casing pipe lining the borehole wall). Mud pumps are commonly used to deliver drilling fluid to the drill string during drilling operations. Many conventional mud pumps are of a triplex configuration, having three piston-cylinder assemblies driven out of phase by a common crankshaft and hydraulically coupled between a suction manifold and a discharge manifold. During operation of the mud pump, each piston reciprocates within its associated cylinder. As the piston moves to expand the volume within the cylinder, drilling fluid is drawn from the suction manifold into the cylinder. After the piston reverses direction, the volume within the cylinder decreases and the pressure of drilling fluid contained with the cylinder increases. When the piston reaches the end of its stroke, pressurized drilling fluid is exhausted from the cylinder into the discharge manifold. While the mud pump is operational, this cycle repeats, often at a high cyclic rate, and pressurized drilling fluid is continuously fed to the drill string at a substantially constant rate.

BRIEF SUMMARY OF THE DISCLOSURE

Some embodiments disclosed herein are directed to a pump assembly for pressurizing a working fluid. In an embodiment the pump assembly includes a frame, a fluid end, and a power end coupled to the frame and the fluid end. In addition, the pump assembly includes a plurality of connectors coupled between the fluid end and the frame. Each of the connectors includes an axis, a first connector member, and a second connector member. The first connector member is configured to actuate relative to the second connector member to adjust a total axial length of the connector along the axis.

Other embodiments disclosed herein are directed to a pumping system for pressurizing a working a fluid. In an embodiment, the pumping system includes a suction manifold, a discharge manifold, and a plurality of pump assemblies coupled between the suction manifold and the discharge manifold. Each of the plurality of pump assemblies includes a frame, a fluid end, and a power end coupled to the frame and the fluid end. In addition, each of the plurality of pump assemblies includes a plurality of connectors coupled between the fluid end and the frame. Each of the connectors includes an axis, a first connector member, and a second connector member. The first connector member is configured to actuate relative to the second connector member to adjust a total axial length of the connector along the axis.

Still other embodiments disclosed herein are directed to a method. In an embodiment, the method includes coupling a power end of a pump assembly to a transmission. In addition, the method includes coupling the transmission to a fluid end of the pump assembly with a plurality of connectors, wherein each connector comprises an axis. Further, the method includes adjusting a total axial length of at least one of the connectors to adjust an alignment of the fluid end relative to the transmission.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIGS. 17 and 18 are perspective and side views, respectively of a second of the wedge members of each of the wedge assemblies of the adjustment assembly of FIG. 13;

FIGS. 20 and 21 are sequential top views of the adjustment assembly of FIG. 13 where the widths of the wedge assemblies are adjusted to laterally move the foot and fluid end of the pump assembly.

DETAILED DESCRIPTION OF EXEMPLARY EMBODIMENTS

Figure 1:
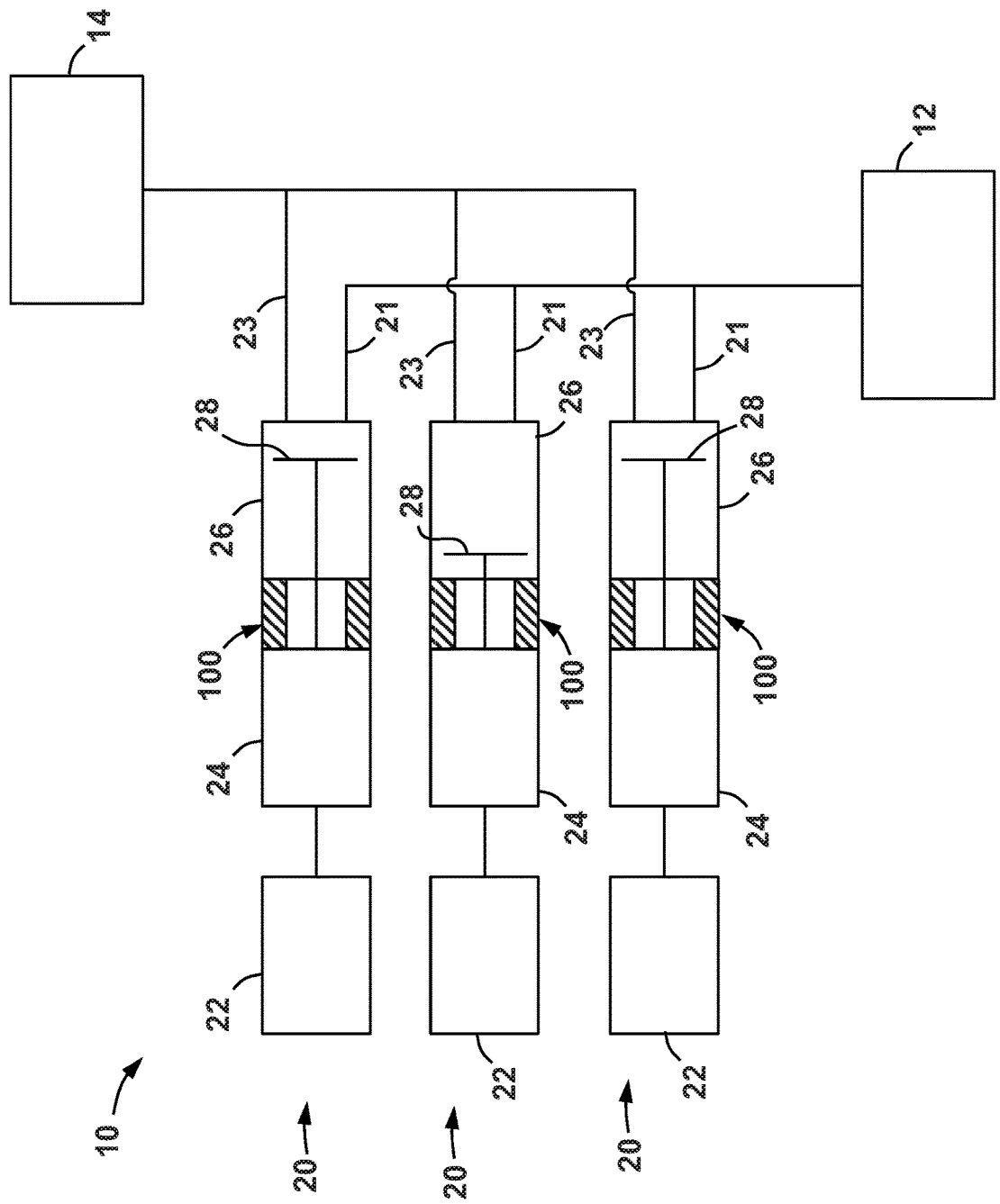
FIG. 1 is a schematic view of a pump system in according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, as used herein the terms "generally," "about," "approximately," "substantially," etc. mean plus or minus 20%.

As previously described above, mud pumps, including multiple piston-cylinder assemblies driven out of phase by a common crankshaft, are typically used to deliver drilling fluid to a drill string during drilling operations. These pumps have a set footprint and configuration. Thus, if it is desired to increase the flow rate of drilling fluid above what the piston-cylinder assemblies can deliver, an additional mud pump must be installed, or another mud pump must be designed and fabricated that includes the appropriate number of piston-cylinder assemblies to provide the desired flow rate of drilling fluid. As a result, these conventional mud pumps are not easily adaptable to the changing specifications and needs of many drilling applications. In addition, adequate space must be provided at the drill site to accommodate not only the size of these mud pumps but also the set footprint thereof.

Accordingly, embodiments disclosed herein include pumping systems for pressurizing a working fluid (e.g., drilling fluid injected into a subterranean wellbore), that include a plurality of modular pump assemblies. As a result, the number and specific arrangement of the modular pump assemblies may be altered as desired to accommodate a specific flow rate, pressure, and spacing requirements of the drilling operation.

In addition, for any pump assembly, each of the components of the fluid end and power end must be properly aligned to ensure proper operation (and avoid accelerated wear and damage). Achieving the proper alignment of components with a modular system can be particularly challenging given the potential difference between individual modular components. These challenges can often be exacerbated when construction or assembly of the modular system (e.g., such as the modular pumping system disclosed herein) occurs in an operational field (e.g., a drill site) and not in a more controlled environment such as a machine shop. Accordingly, embodiments of the pump assemblies disclosed herein include various assemblies and components that allow for proper alignment of the modular components of the pump assemblies, even when such modular components are assembled at the worksite. Thus, by utilizing the assemblies and components of the embodiments disclosed herein, the assembly and use of a modular pump assembly at an industrial worksite may be more practically facilitated.

Referring now to FIG. 1, a pumping system 10 for pressurizing a working fluid (e.g., drilling mud) is shown. Pumping system 10 generally includes a suction manifold 12, a discharge manifold 14, and a plurality of pumping assemblies 20. Suction manifold 12 is in fluid communication with a working fluid source (e.g., a mud pit), and discharge manifold 14 is in fluid communication with a fluid delivery point (e.g., a central throughbore of a drill string). Each pump assembly 20 is coupled to suction manifold 12 with a corresponding suction line 21, and is coupled to discharge manifold 14 with a corresponding discharge line 23, such that each pump assembly 20 is configured to receive fluids from suction manifold 12 via the corresponding suction line 21, and emit pressurized fluid to one of the discharge manifolds 14 via the corresponding discharge line 23.

Each pump assembly 20 includes a power end 22, a transmission 24, and a fluid end 26. In this embodiment, power end 22 comprises a motor that may be any suitable motor or driver that is configured to actuate (e.g., rotate) an output shaft, such as, for example, an electric motor, hydraulic motor, internal combustion engine, turbine, etc. In this embodiment, the motor of power end 22 comprises an electric motor.

Transmission 24 comprises any suitable mechanism that is configured to translate the output from power end 22 into an input drive for fluid end 26. For example, in this embodiment, power end 22 (or a motor within power end 22) drives the rotation of an output shaft and transmission 24 is configured to convert the rotational motion of the output shaft into a reciprocal motion for driving a piston 28 within fluid end 26. Transmission 24 may comprise any suitable arrangement of gears, cams, sliders, carriages, or other components to affect the desired motion conversion between power end 22 and fluid end 26. For example, in some embodiments, transmission may comprise any of the transmission embodiments of WO 2017/123656, the contents of which are incorporated herein by reference in their entirety for all purposes.

In this embodiment, piston 28 is reciprocally driven within fluid end 26 to pressurize a working fluid. In particular, the piston 28 is configured to reciprocate within fluid end 26 between a suction stroke to draw in fluid into fluid end 26 from suction manifold 12 via the corresponding line 21, and a discharge stroke to discharge fluid into manifold 14 from fluid end 26 via the corresponding line 23. During the suction stroke, the piston 28 may be withdrawn from the fluid end 26 (e.g., toward transmission 24), and during the discharge stroke, the piston 28 may be advanced into the fluid end 26 (e.g., away from transmission 24). While not specifically shown, fluid end 26 includes valves that facilitate the flow through lines 21, 23, during the suction and discharge strokes, respectively. For example, in some embodiments, fluid end 26 includes a suction valve that is configured to allow the working fluid to enter the fluid end 26 from suction line 21 during a suction stroke of the piston 28, and a discharge valve that is configured to allow the working fluid to exit the fluid end 26 into discharge line 23 during a discharge stroke. The suction valve may be further configured to prevent fluid from flowing out of fluid end 26 into suction line 21 during a discharge stroke, and the discharge valve may be further configured to prevent fluid from entering into fluid end 26 from the discharge line 23 during a suction stroke. In some embodiments, the valves within fluid end 26 may be the same or similar to those disclosed in U.S. Pat. Nos. 8,220,496 and/or 8,714,193, the entire contents of each being incorporated herein by reference for all purposes.

Referring still to FIG. 1, the components of each of the pump assemblies 20 (e.g., the power end 22, transmission 24, and fluid end 26) are all modular components that may be separately shipped to the work site (e.g., a drill site) and assembled to form pump assemblies 20. In order to ensure the proper performance and operation of pump assemblies 20, each of the power end 22, transmission 24, and fluid end 26 should be aligned and secured to one another such that power end 22, transmission 24, and fluid end 26 may properly cooperate and engage with one another during pumping operations. In particular, fluid end 26 should be properly aligned with transmission 24 such that the piston 28 may be reciprocated by transmission 24 within the fluid end 26 with an acceptable amount of stresses and wear. However, differences between individual, modular transmissions 24 and fluid ends 26 may make a precise alignment difficult (especially at the worksite). The differences between these individual modular components may include structural irregularities, such as might typically result from manufacturing tolerances. Accordingly, each of the pump assemblies 20 further includes a plurality of connectors 100 for coupling and aligning fluid end 26 to transmission 24. As will be described in more detail below, the connectors 100 provide fine adjustment of the relative alignment between transmission 24 and fluid end 26 so that modular pump assemblies 20 may be more easily and efficiently deployed at a worksite.

Figure 2:
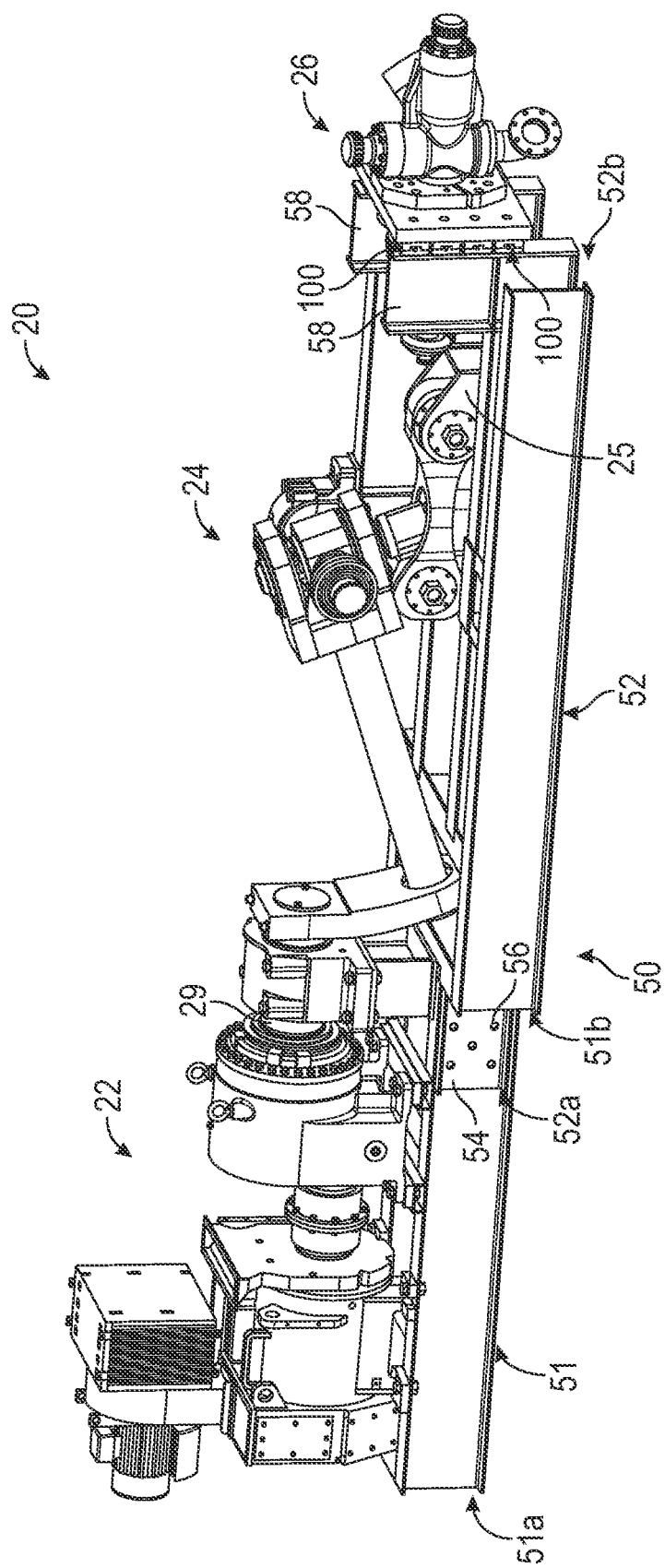
FIG. 2 is a perspective view of one of the pumping assemblies for use with in the pump system of FIG. 1.

Referring now to FIG. 2, an embodiment of one of the pumping assemblies 20 is shown, it being understood that each of the pumping assemblies 20 may be configured the same. As shown in FIG. 2, power end 22 includes an output shaft 29 that is coupled to transmission 24, and transmission 24 includes a carriage 25 that is coupled to the piston within fluid end 26 (not shown in FIG. 2—see piston 28 in FIG. 1). Generally speaking, during operations power end 22 drives output shaft 29 to rotate, which thereby actuates transmission 24 to drive reciprocation of carriage 25. Because carriage 25 is coupled to the piston (not shown) within fluid end 26, the reciprocation of carriage 25 also drives reciprocation of the piston within fluid end 26 between the suction and discharge strokes as previously described above.

Referring still to FIG. 2, pump assembly 20 also includes a base or frame 50 to support power end 22, transmission 24, and fluid end 26. In this embodiment, base 50 includes a first or motor base 51, and a second or transmission base 52 coupled to motor base 51. Motor base 51 supports power end 22 (including any motors or gearing mechanisms included therein), while transmission base 52 supports transmission 24 and fluid end 26.

Motor base 51 comprises a first end 51a, and a second end 51b that is opposite first end 51a. Similarly, transmission base 52 includes a first end 52a, and a second end 52a that is opposite first end 52a. Motor base 51 is coupled to the first end 52a of transmission base 52 at second end 51b via one or more mounting plates 54 that are disposed on first end 52a of transmission base 52. Mounting plates 54 each include a plurality of holes or apertures 56 for receiving bolts or other connection members (e.g., screws, pins, rivets, etc.) therethrough. In addition, transmission base 52 includes a pair of vertically oriented support extensions 58 at second end 52b for supporting fluid end 26 on base 52. As will be described in more detail below, fluid end 26 is secured to a mounting plate 27 and plate 27 is coupled to support extensions 58 via the plurality of connectors 100.

Power end 22 may be decoupled from transmission 24 and bases 51, 52 may also be decoupled at mounting plates 54 so that power end 22 may be transported or maneuvered separately from transmission 24 and fluid end 26 on base 26. In addition, fluid end 26 may be decoupled from base 52 at support extensions 58 so that fluid end 26 may be transported or maneuvered separately from transmission 24 and base 52. Therefore, bases 51, 52 help to facilitate the modularity of pump assembly 20 by providing relatively simple attachment points between the components.

Figure 3:
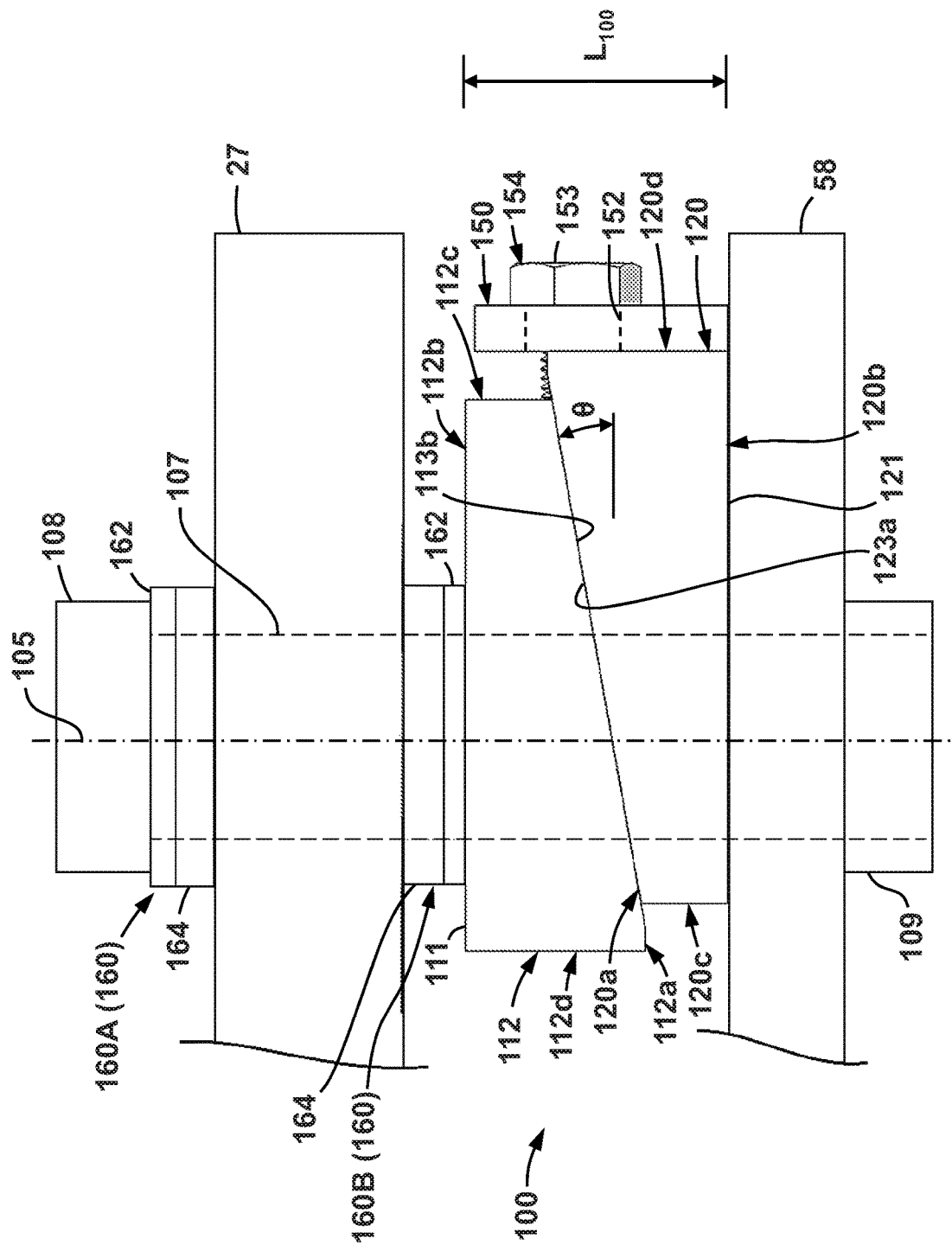
FIG. 3 is a side view of a connector for coupling the fluid end to the transmission of the pumping assembly of FIG. 2.

Referring now to FIGS. 2 and 3, as previously described, plate 27 of fluid end 26 is mounted to extensions 58 on transmission base 52 via connectors 100. As will be described in more detail below, each of the connectors 100 includes actuatable to adjust the relative alignment between plate 27 and extensions 58 to thereby ensure a desired alignment between fluid end 26 and transmission 24 during operations.

Referring now to FIG. 3, one of the connectors 100 is shown, it being appreciated that each of the connectors 100 are configured the same. Each connector 100 includes a first connector member 112 and a second connector member 120 coupled to one another along a central bolt 107. Bolt 107 includes a central axis 105 such that connector members 112, 120 are axially stacked along axis 105. Bolt 27 extends along axis 105 through plate 27, wedge members 112, 120, and extensions 58 in base 52 to secure fluid end 26 to base 52 during operations (see FIG. 2). Connector 100 defines an axial length $L_{100}$ that extends along axis 105. As will be described in more detail below, the connector members 112, 120 may be controllably actuated relative to one another to adjust axial length $L_{100}$ of each connector 100, which thereby adjusts an overall alignment of plate 27 (and thus fluid end 26) and support extensions 58 during operations.

Figure 4:
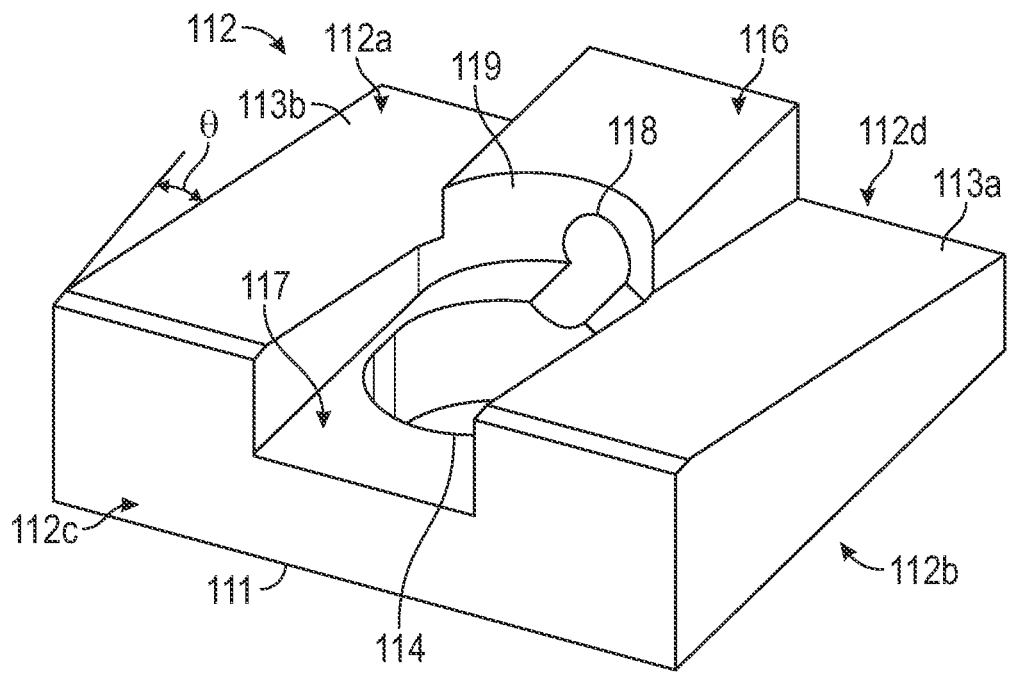
FIGS. 4 and 5 are perspective views of a first connector member of the connector of FIG. 3.
Figure 5:
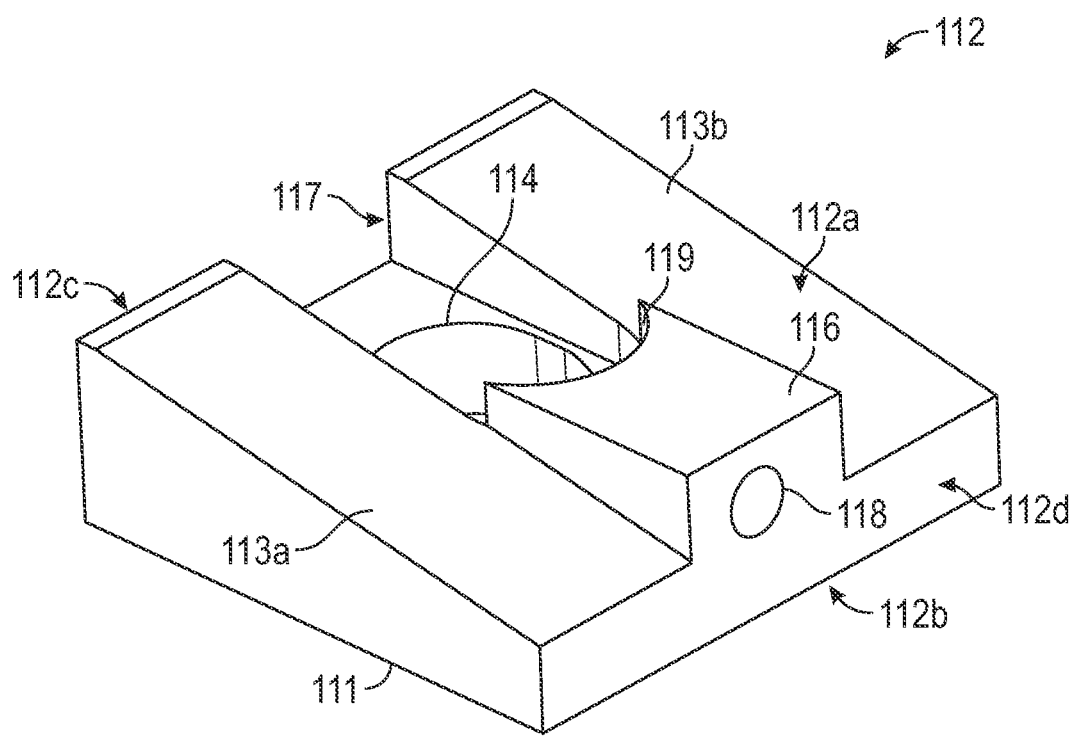

Referring now to FIGS. 3-5, first connector member 112 includes a first end 112a, and a second end 112b axially opposite first end 112a along axis 105 (see FIG. 3). In addition, first connector member 112 includes a first radial side 112c and a second radial side 112d opposite first radial side 112c.

Second end 112b includes a generally planar surface 111. First end 112a includes a pair of inclined planar surfaces 113a, 113b disposed on radially opposing sides of axis 105 (note: only inclined planar surface 113b is shown in the view of FIG. 3). Each of the inclined planar surfaces 113a, 113b (or ramped surfaces 113a, 113b) are angled or inclined from the first radial side 112c toward the second radial side 112d, such that an axial distance between planar surface 111 and ramped surfaces 113a, 113b is greater at first radial side 112c than at second radial side 112d. In particular, planar surfaces 113a, 113b are disposed at an angle θ relative to the radial direction across axis 105. In some embodiments, the angle θ may range from 0 to 90°, or from 0 to 15°, or from 5 to 10°.

In addition, as best shown in FIGS. 4 and 5, first connector member 112 includes a radially extending recess 117 extending radially from first radial side 112c. Recess 117 is radially disposed between inclined planar surfaces 113a, 113b and includes an axially extending curved surface 119. An axially extending projection 116 extends radially from surface 119 to second radial side 112d that is also radially disposed between ramped surfaces 113a, 113b.

A slot 114 extends axially from recess 117 to planar surface 111 at second end 112b. Slot 114 is elongated radially and includes an oblong cross-section in this embodiment. In addition, a bore 118 extends radially from second radial side 112 to curved surface 119. In this embodiment, bore 118 is tapped (i.e., threaded) and thus includes a helical thread therein (not specifically shown in FIGS. 3-5).

Figure 6:
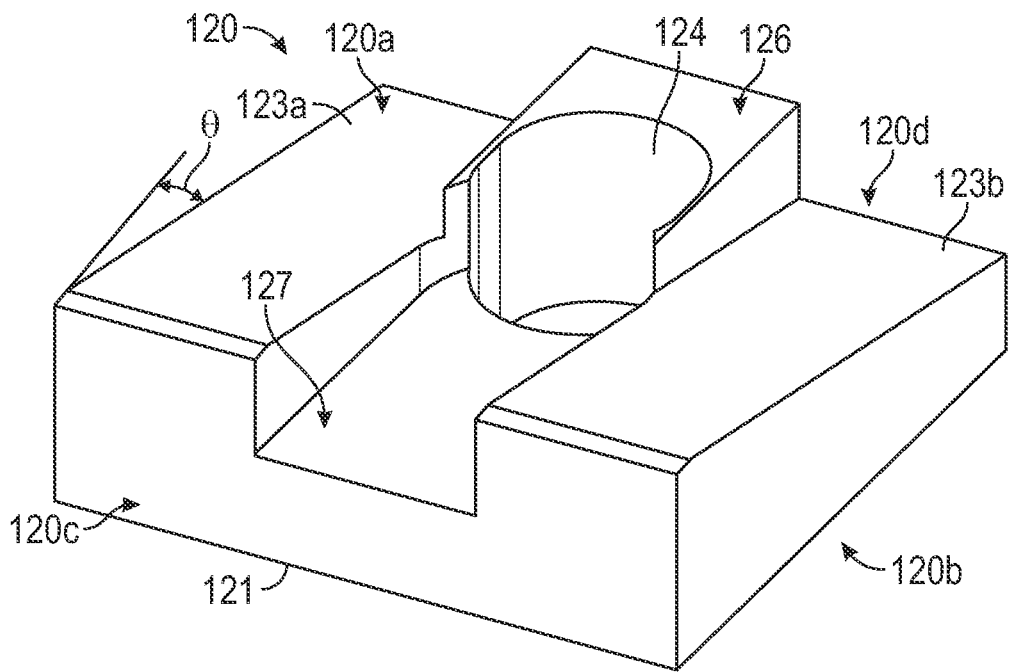
FIGS. 6 and 7 are perspective views of a second connector member of the connector of FIG. 3.
Figure 7:
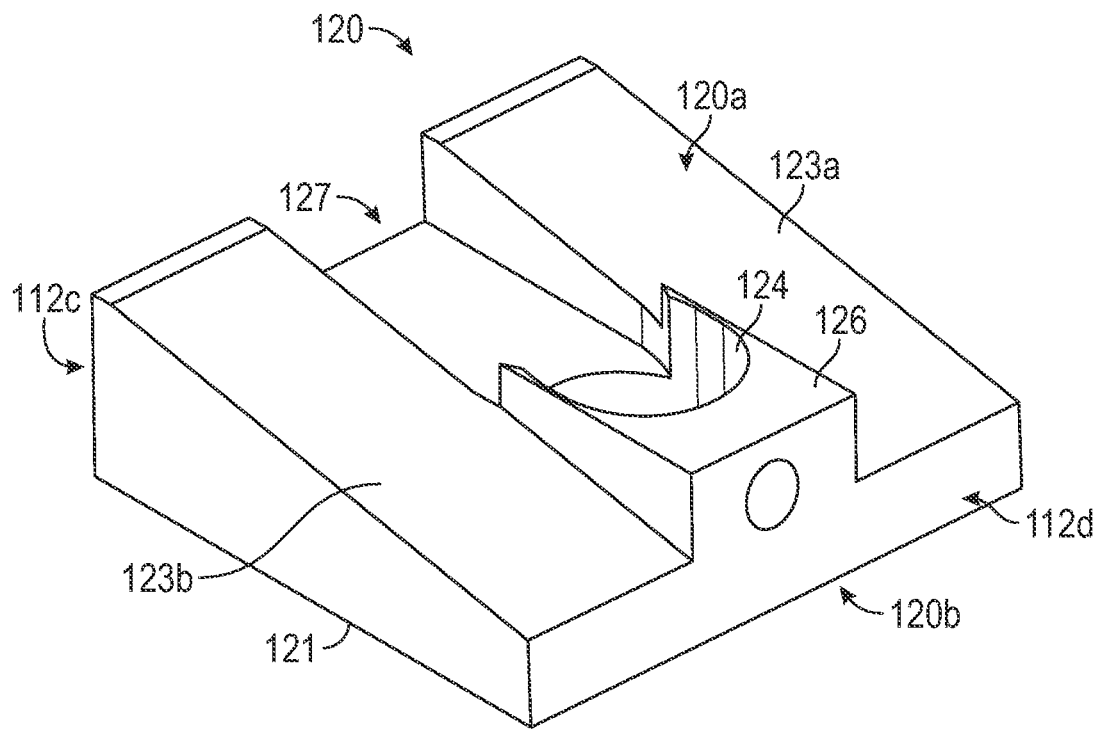

Referring now to FIGS. 3, 6, and 7, second connector member 120 includes a first end 120a, and a second end 120b axially opposite first end 120a along axis (see FIG. 3). In addition, second connector member 120 includes a first radial side 120c and a second radial side 120d opposite first radial side 120c.

Second end 120b includes a generally planar surface 121. First end 120a includes a pair of inclined planar surface 123a, 123b disposed on radially opposing sides of axis 105 (note: only inclined planar surface 123a is shown in the view of FIG. 3). Each of the inclined planar surfaces 123a, 123b (or ramped surfaces 123a, 123b) are angled or inclined from first radial side 120c toward the second radial side 120d such that an axial distance between planar surface 121 and ramped surfaces 123a, 123b is greater at first radial side 120c than at second radial side 120d. In particular, planar surfaces 123a, 123b are disposed at the angle θ relative to the radial direction across axis 105.

In addition, as best shown in FIGS. 6 and 7, second connector member 120 includes a radially extending recess 127 extending radially from first radial side 120c. Recess 127 is radially disposed between inclined planar surfaces 123a, 123b. Further, an axially extending projection 126 extends radially from second radial side 120d to recess 127 that is also radially disposed between ramped surfaces 123a, 123b.

A slot 124 extends axially from projection 126 to planar surface 121. Slot 124 is elongated radially and includes an oblong cross-section in this embodiment.

Figure 8:
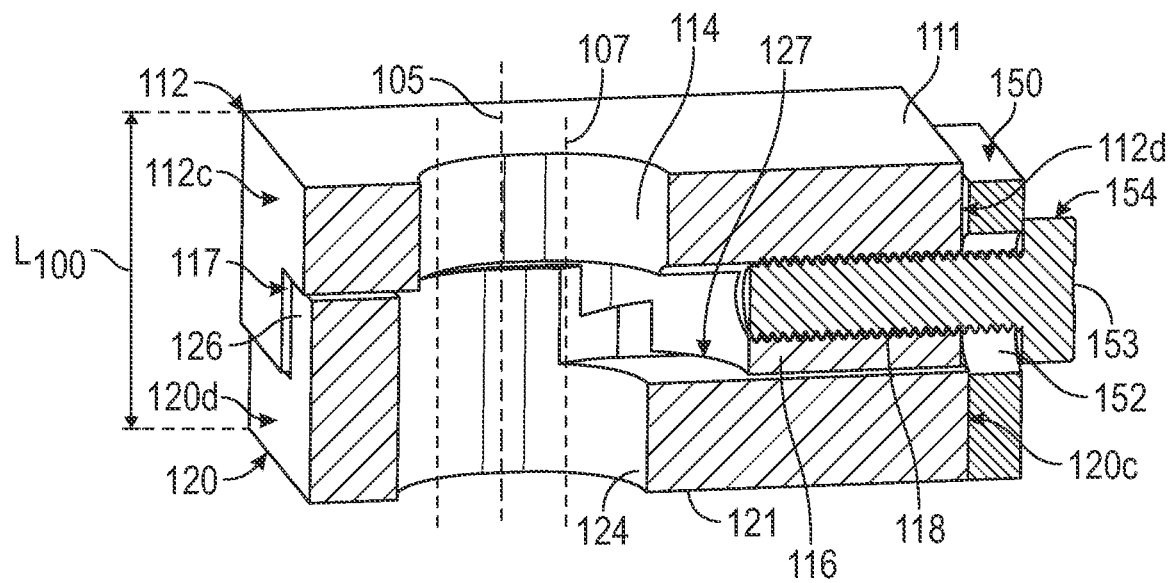
FIGS. 8 and 9 are sequential, perspective cross-sectional views of the connector of FIG. 3 being actuated to adjust a total axial length thereof.
Figure 9:
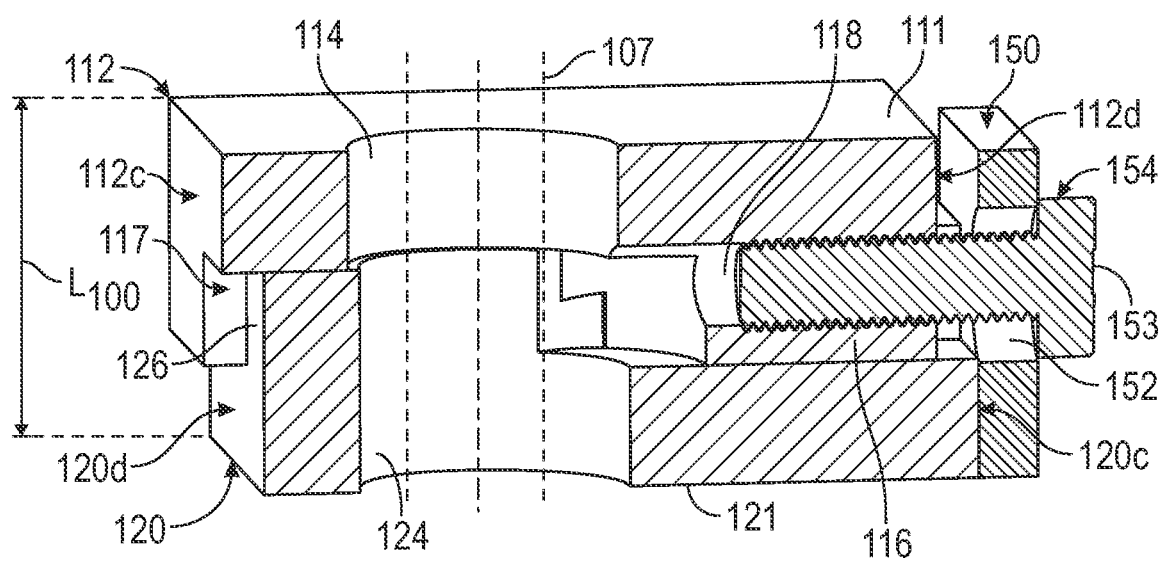

Referring now to FIGS. 3, 8, and 9, during operations, first connector member 112 is engaged with second connector member 120 such that projection 126 of second connector member 120 is received within recess 117 of first connector member 112, and projection 116 of first connector member 112 is received within recess 127 of second connector member 120. Thus, axial length $L_{100}$ of connector 100 extends axially (along axis 105) from between planar surfaces 111, 121 of connector members 112, 120, respectively. Note: the approximate position of bolt 107 and axis 105 are schematically shown in FIGS. 8 and 9 so as to more clearly show the interaction between connector members 112, 120, bolt 107, and axis 105 during operations.

In addition, as is best shown in FIG. 3, when connector members 112, 120 are engaged with one another, inclined planar surface 123a on second connector member 120 is engaged with inclined planar surface 113b of first connector member 112. While not specifically shown in FIG. 3, inclined planar surface 123b on second connector member 120 similarly engages with inclined planar surface 113a on first connector member 112. Further, when connector members 112, 120 are engaged, slots 114, 124 are also at least partially radially aligned or overlapped such that bolt 107 may be inserted through slots 114, 124 along axis 105. Depending on the relative radial positions of connector members 112, 120 with respect to axis 105, slots 114, 124 may be partially or totally aligned or overlapped. Therefore, the relative radial widths of slots 114, 124 and the radial clearance between bolt 107 and the walls of slots 114, 124 define the range of relative radial positions that connector members 112, 120 may occupy while bolt 107 extends therethrough.

Referring still to FIGS. 3, 8, and 9, an adjustment member 154 is inserted through an aperture 152 in a washer plate 150 and threadably engaged within bore 118 of connector member 112. Adjustment member 154 includes a head 153 that is larger than the size of aperture 152. Accordingly, as adjustment member 154 is advanced radially (e.g., with respect to axis 115 of member 112) into bore 118, eventually head 153 of member 154 bears against washer plate 150. Additionally, when connector member 112, 120 are engaged with one another as shown in FIGS. 8 and 9, plate 150 also bears against first radial side 120c of connector member 120. After washer plate 150 is captured between head 153 and first radial side 120c of member 120 as described, continued threaded advancement of adjustment member 154 within bore 118 pulls or urges first connector member 112 radially toward washer plate 150 with respect to axis 105 and relative to second connector member 120. Alternatively, threaded withdrawal of adjustment member 154 from bore 118 forces or pushes first connector member 112 radially away from washer plate 150 with respect to axis 105 and relative to second connector member 120. First connector member 112 may translate radially toward plate 150 with respect to axis 105 relative to second connector member 120 until second radial side 112d of first connector member 112 engages or abuts plate 150.

Referring specifically to FIGS. 8 and 9, as first connector member 112 is radially translated relative to second connector member 120 relative to axis 105 (e.g., such as by threadably advancing/withdrawing adjustment member 154 within bore 118) the value of the axial length $L_{100}$ also changes due to the sliding engagement of inclined planar surfaces 113a, 113b on connector member 112 with inclined planar surfaces 123a, 123b on connector 120. In particular, the relative radial movement of connector members 112, 120 (with respect to axis 105) causes sliding engagement between inclined planar surface 113a of connector member 112 and inclined planar surface 123b of connector member 120, and between inclined planar surface 113b of connector member 112 and inclined planar surface 123a of connector 120. Due to the incline and relative orientation of surfaces 113a, 123b, and of surfaces 113b, 123a, the above described relative sliding engagement between connector members 112, 120 results in a relative axial movement of planar surfaces 111 and 121, on connectors 112 and 120, respectfully along axis 105. Specifically, as shown in FIGS. 8 and 9, threaded advancement of adjustment member 154 radially into bore 118 translates first connector member 112 radially toward washer plate 150 and moves planar surface 111 of connector member 112 axially away from planar surface 121 of connector member 120. As a result, the threaded advancement of adjustment member 154 within bore 118 increases axial length $L_{100}$. Conversely, threaded withdrawal of adjustment member 154 radially from bore 118 translates first connector member 112 radially away from washer plate 150 and moves planar surface 111 of connector member 112 axially toward planar surface 121 of connector member 120. As a result, the threaded withdrawal of adjustment member 154 within bore 118 decreases axial length $L_{100}$.

Referring again to FIG. 3, as the axial length $L_{100}$ is increased and decreased via threaded advancement and withdrawal, respectively, of adjustment member 154 within bore 118, the axial distance (with respect to axis 105) between plate 27 and support extension also increases and decreases, respectively, at the connector 100 in question. Accordingly, through the actuation of first connector member 112 radially relative to second connector member 120 (e.g., via adjustment member 154 as previously described) between select connectors 100, the overall alignment between mounting plate 27 and support extensions 58 (and thus between fluid end 26 and transmission 24) may be selectively and controllable adjusted.

As shown in FIG. 3, when a desired value of axial length $L_{100}$ is achieved for a given connector 100 (e.g., such as a value of axial length $L_{100}$ to contribute to an overall desired alignment between fluid end 26 and transmission 24), a nut 109 (or other locking member) may be threaded onto bolt 107 on an opposing side of support extension 58 from connector 100. Thereafter, sufficient torque is applied to nut 109 about axis 105 such that connector 100 is axially compressed between plate 27 and extension 58 to maintain the relative radial positioning of connector members 112, 120 and the resulting, desired axial length $L_{100}$.

Referring still to FIG. 3, in this embodiment, a pair of spherical washer assemblies 160 is also disposed along bolt 107 on either axial side of plate 27, with respect to axis 105. In particular, referring briefly to FIG. 10, each spherical washer assembly 160 includes a first washer member 162 and a second washer member 164. First washer member 162 is a generally cylindrical member that includes a throughbore 161 and a convex spherical surface 163 disposed at one end thereof. Second washer member 164 is also a generally cylindrical member that includes a throughbore 165 and a concave spherical surface 166 disposed at one end thereof. Convex spherical surface 163 is engaged with concave spherical surface 166 and throughbores 161, 165 are generally aligned.

Figure 10:
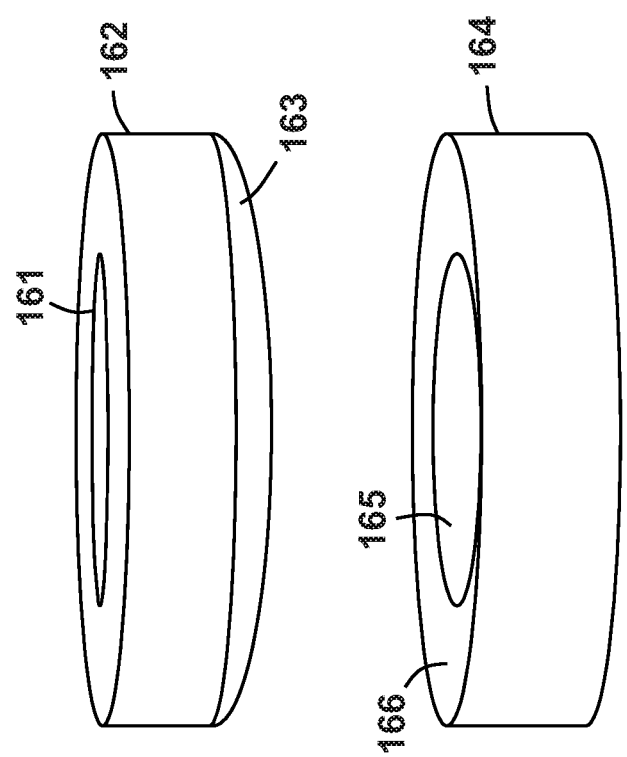
FIG. 10 is a perspective, exploded view of a spherical washer for use with the connector of FIG. 3.

Referring now to FIGS. 3 and 10, one spherical washer assembly 160 (designated in FIG. 3 as washer assembly 160A) is disposed axially between a head 108 of bolt 107 and mounting plate 27 and another spherical washer assembly 160 (designated in FIG. 3 as washer assembly 160B) is disposed axially between plate 27 (on an opposing axial side of plate 27 from head 108) and second connector member 120. First washer member 162 of washer assembly 160A is engaged with head 108 of bolt 107, and second washer member 164 of washer assembly 160A is engaged with plate 27. Also, first washer 162 of washer assembly 160B is engaged with planar surface 121 of second connector member 120, while second washer member 164 of washer assembly 160B is engaged with mounting plate 27. Without being limited to this or any other theory, the engaged spherical surfaces (e.g., surfaces 163, 166) of washer members 162, 164 of washer assemblies 160A, 160B allow for enhanced surface and thus, pressure and force transmission between washer assemblies 160A, 160B, plate 27, and connector 100 during operations even if plate 27 and support extensions 58 are slightly misaligned with one another.

Figure 11:
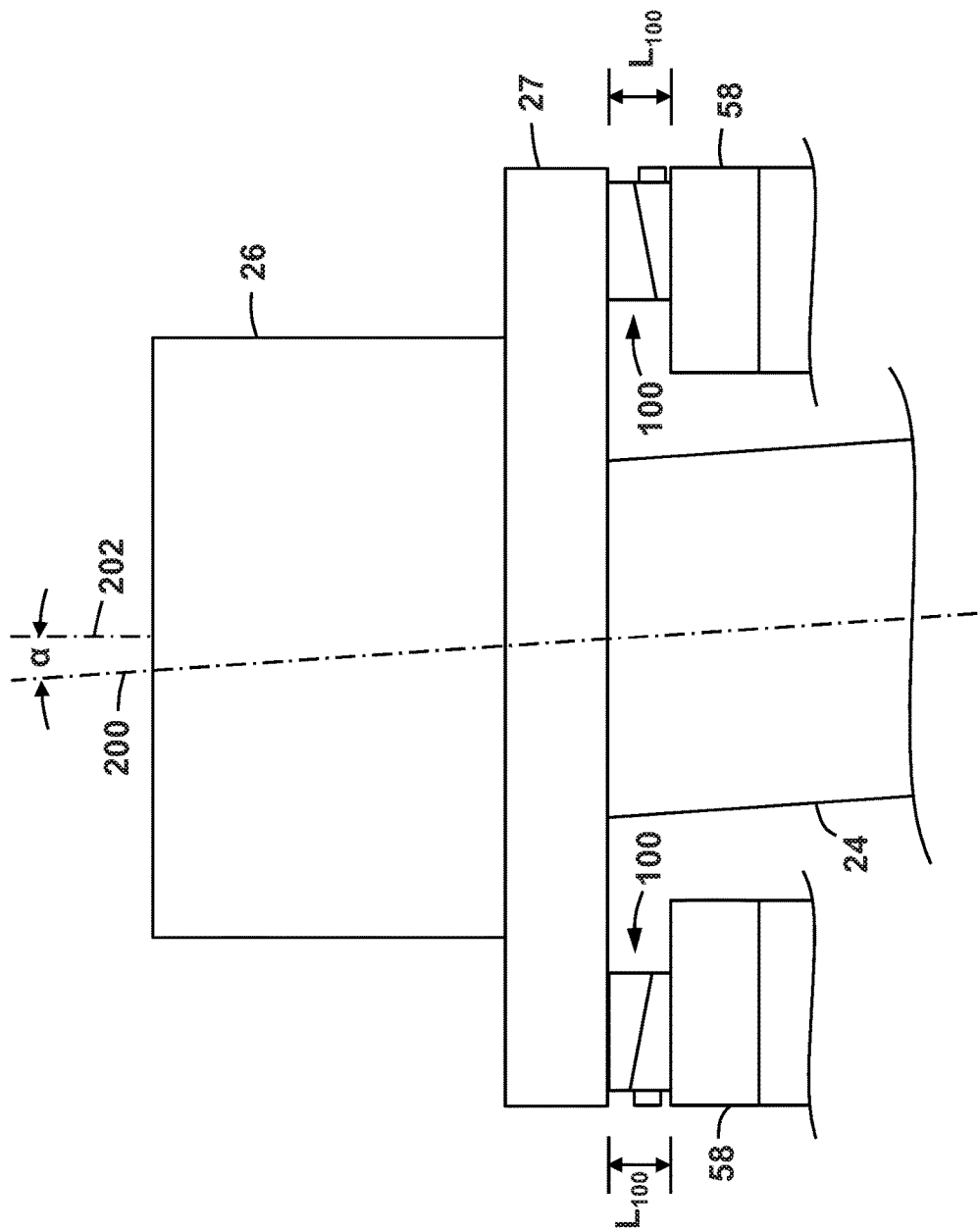
FIG. 11 is a top schematic view of a misaligned fluid end and transmission of a pumping assembly according to at least some embodiments.
Figure 12:
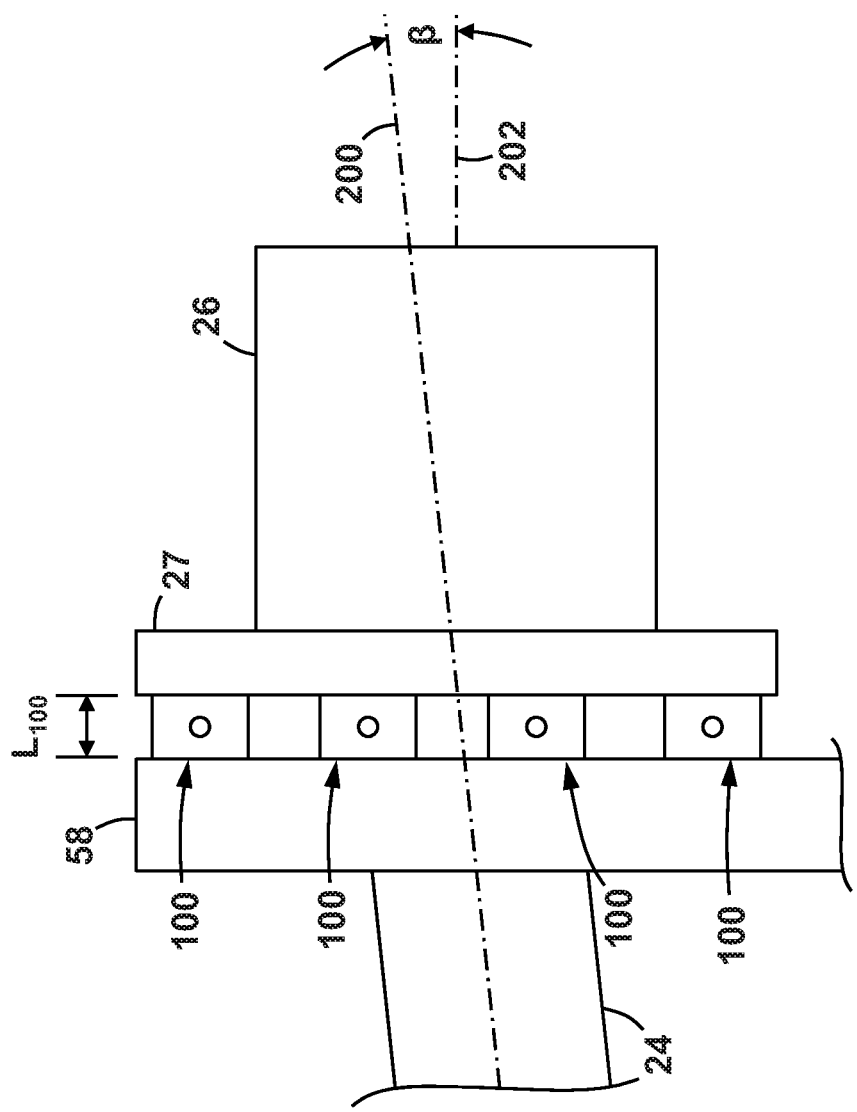
FIG. 12 is a side schematic view of a misaligned fluid end and transmission of a pumping assembly according to at least some embodiments.

Referring now to FIGS. 11 and 12, which show top and side schematic views, respectively, of support extensions 58, fluid end 26, and connectors 100. As previously described above, an alignment between fluid end 26 and transmission 24 (and between mounting plate 27 and support extensions 58) may be adjusted by the selective adjustment of axial lengths $L_{100}$ of connectors 100. In some embodiments, the alignment adjustment between fluid end 26 and transmission 24 may comprise an angular alignment.

For example, referring first to FIG. 11, in some embodiments a longitudinal axis of transmission 200 may be initially misaligned with an axis 202 of fluid end 26 by an amount represented by the angle α. The angle α is measured in a generally lateral plane including both the axes 200, 202. In some embodiment the axes 200, 202 of transmission 24 and fluid end 26 may represent the axes of components that should be aligned (or closely aligned) during operations to ensure proper operation of pumping assembly 20 (see FIG. 2) and to avoid excessive wear. For example, axis 200 of transmission 24 may represent an axis of reciprocation of carriage 25 (see FIG. 2) and axis 202 of fluid end 26 may represent an axis of reciprocation for piston 28 (see FIG. 1). As a result, it is desirable in these embodiments to ensure proper alignment between axes 200, 202 during pumping operations.

In order to bring axes 200, 202 into alignment per the misalignment shown in FIG. 11 (i.e., to reduce the angle α to zero or near zero), the lengths $L_{100}$ of select connectors 100 are adjusted (e.g., by withdrawing or advancing adjustment member 154 within the corresponding bore 118 as previously described above). For example, one or more of the lengths $L_{100}$ of the connectors 100 engaged between plate 27 and one of the support extensions 58 may be increased or decreased relative to the lengths $L_{100}$ of one or more of the connectors 100 engaged between plate 27 and the other support extension 58. Specifically, in this embodiment, one or more of the connectors 100 are actuated so that the lengths L100 of one or more of the connectors 100 engaged between mounting plate 27 and the left-most support extension 58 in FIG. 11 are shorter than the lengths $L_{100}$ of one or more of the connectors 100 engaged between mounting plate 27 and the right-most support extension 58 in FIG. 11.

Referring now to FIG. 12, in some embodiments, the axes 202 and 200 of fluid end 26 and transmission 24, respectively, may be additionally or alternatively misaligned by an angle β measured in a generally vertically oriented plane containing both the axes 200, 202. In order to bring axes 200, 202 into alignment per the misalignment shown in FIG. 12 (i.e., to reduce the angle β to zero or close to zero), the lengths $L_{100}$ of select connectors 100 are adjusted (e.g., again by withdrawing or advancing adjustment member 154 within the corresponding bore 118 as previously described above). For example, one or more of the lengths $L_{100}$ of the lower positioned connectors 100 between support extensions 58 and mounting plate 27 may be increased or decreased relative to the lengths $L_{100}$ of the higher positioned connectors 100 between support extensions 58 and mounting plate 27. Specifically, in this embodiment, one or more of the connectors 100 engaged between support extensions 58 and mounting plate 27 are actuated so that the lengths $L_{100}$ of the lower positioned connectors 100 (e.g., the two lower most connectors 100 shown in FIG. 12) are smaller than the lengths $L_{100}$ of the upper positioned connectors 100 (e.g. the two upper most connectors 100 shown in FIG. 12).

Referring still to FIGS. 11 and 12, it should be appreciated that the fluid end 26 may be uniformly actuated or moved axially away from transmission 24 along axes 200, 202 (assuming axes 200, 202 are aligned) by uniformly increasing or decreasing the lengths $L_{100}$ of all of the connectors 100.

Figure 13:
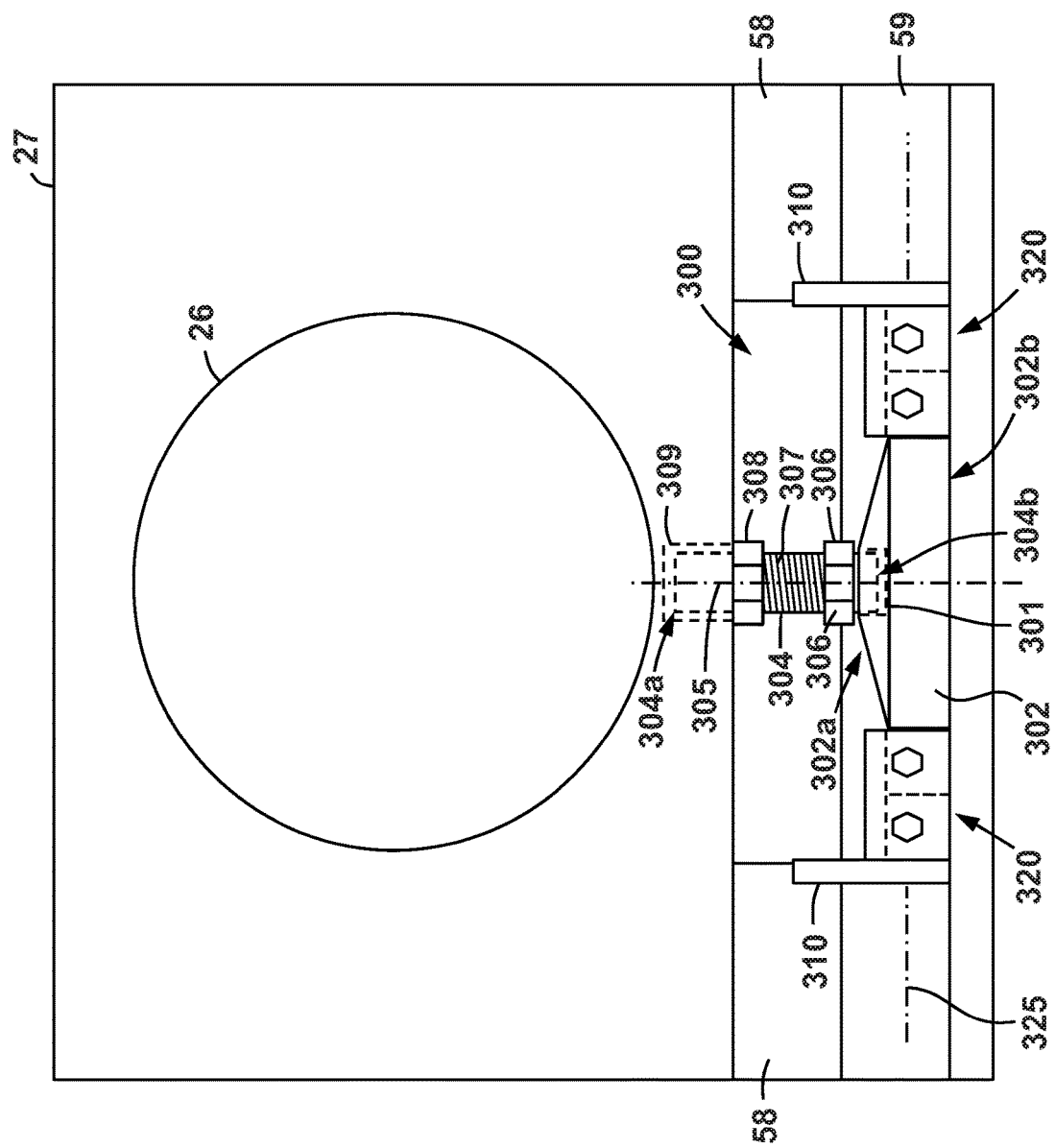
FIG. 13 is a schematic view of an adjustment assembly for adjusting a vertical and lateral position of the fluid end of the pumping assembly of FIG. 2 according to some embodiments.

Referring now to FIG. 13, some embodiments of pump assemblies 20 may include an adjustment assembly 300 for adjusting the lateral and vertical position of fluid end 26 relative to transmission 24 and frame 50 (see FIG. 2). It should be appreciated that adjustment assembly 300 may be included either in lieu of or in addition to connectors 100, previously described above. In this embodiment, adjustment assembly 300 includes a central axis 305, a foot 302, an engagement rod 304 extending axially between foot 302 and mounting plate 27, and a plurality of wedge assemblies 320.

Foot 302 is a generally cylindrical member that engages with a support bracket 59 mounted to support members 58 on frame 50. In other embodiments, no support bracket 59 is included and foot 302 may engage directly with the underlying support surface (e.g., the ground) upon which frame 50 (see FIG. 2) is disposed. Thus, bracket 59 may also be generally referred to herein as a "support surface." In particular, foot 302 includes a first or upper side 302a and a second or lower side 302b opposite upper side 302a. Lower side 304b is engaged with support bracket 59 (or the underlying support surface as previously described above).

Engagement rod 304 is coupled to upper side 302a of foot 302 and extends axially upward therefrom along axis 305. Accordingly, central axis 305 may be referred to herein as a "rod axis" 305. Engagement rod 304 is an elongate member that includes a first or upper end 304a, and a second or lower end 304b opposite upper end 304a. A plurality of facets 306 are disposed circumferentially about rod 304 that are positioned axially between ends 304a, 304b. In addition, a helical thread 307 extends helically about rod 304, axially from adjustment facets 306 toward upper end 304a. As shown in FIG. 13, upper end 304a of engagement rod 304 inserted within an axially extending mounting aperture or bore 309 in plate 27 and thread 307 is engaged with a corresponding thread (not shown) within aperture 309. In addition, lower end 304b of engagement rod 304 is inserted within an aperture 301 extending axially into foot 302 from upper end 302a, such that lower end 304b is disposed within aperture 301. In this embodiment, engagement rod 304 may rotate about axis 305 relative to foot 302, and thus, suitable bearings (e.g., radial bearings, thrust bearings, etc.—not shown) or other support mechanisms are disposed within aperture 301 of foot 302 to support the relative rotation of rod 304 and foot 302 about axis 305 during operations. These features are not specifically shown in FIG. 13 so as not to unduly complicate the figure. In other embodiments, lower end 304b of rod 304 is integral with or fixably mounted (e.g., welded) to upper side 302a of foot 302.

During operations, engagement rod 304 is rotated about axis 305 relative to mounting plate 27 such that upper end 304a of rod 304 is either threadably advanced into or withdrawn from aperture 309 via the engagement of thread 307 with the corresponding thread (not shown) with aperture 309. Once lower side 302b of foot 302 is engaged with support bracket 59 (or the underlying support surface), the axial adjustment of rod 304 works to adjust or change a position of mounting plate 27 (and thus also fluid end 26) along axis 305 (or a projection thereof). In at least some embodiments, axis 305 is aligned (or substantially aligned) with the vertical direction (or along the direction of gravity). Thus, the axial adjustment of engagement rod 304 relative to mounting plate 27 works to adjust a vertical position of mounting plate 27 and fluid 26 end relative to frame 50 and transmission 24 during operations. Torque may be applied to engagement rod 304 about axis 305 via any suitable method or apparatus. In some embodiments, a wrench or other suitable tool may be engaged with facets 306 to transfer torque to engagement rod 304 and therefor facilitate the desired rotation thereof about axis 305 (and ultimately the desired axial adjustment described above). Thus, by threaded advancement and withdrawal of engagement rod 304 within aperture 309 in mounting plate 27, the vertical position of fluid end 26 may be adjusted so as to achieve a desired alignment between fluid end 26 and transmission 24 (see FIG. 2) during operations.

Referring still to FIG. 13, a locking nut 308 is disposed about engagement rod 304 that is axially positioned between upper end 304a and facets 306. Locking nut 308 includes internal threads (not shown) that are engaged with threads 307 on rod 304. During operations, once a desired axial (or vertical) height of mounting plate 27 and fluid end 26 are achieved, the locking nut may be threadably advanced axially upward along engagement rod 304 until it bears against a lower surface of mounting plate 27 about aperture 209. Thereafter, additional torque may be applied to locking nut 308 about axis 305 so that locking nut 308 bears against mounting plate 27 and rod 304 and additional rotation of engagement rod 304 is prevented (or at least restricted). Thus, locking nut 308 serves to maintain a given axial relative position of engagement rod 304 and mounting plate 27 during operations.

Figure 14:
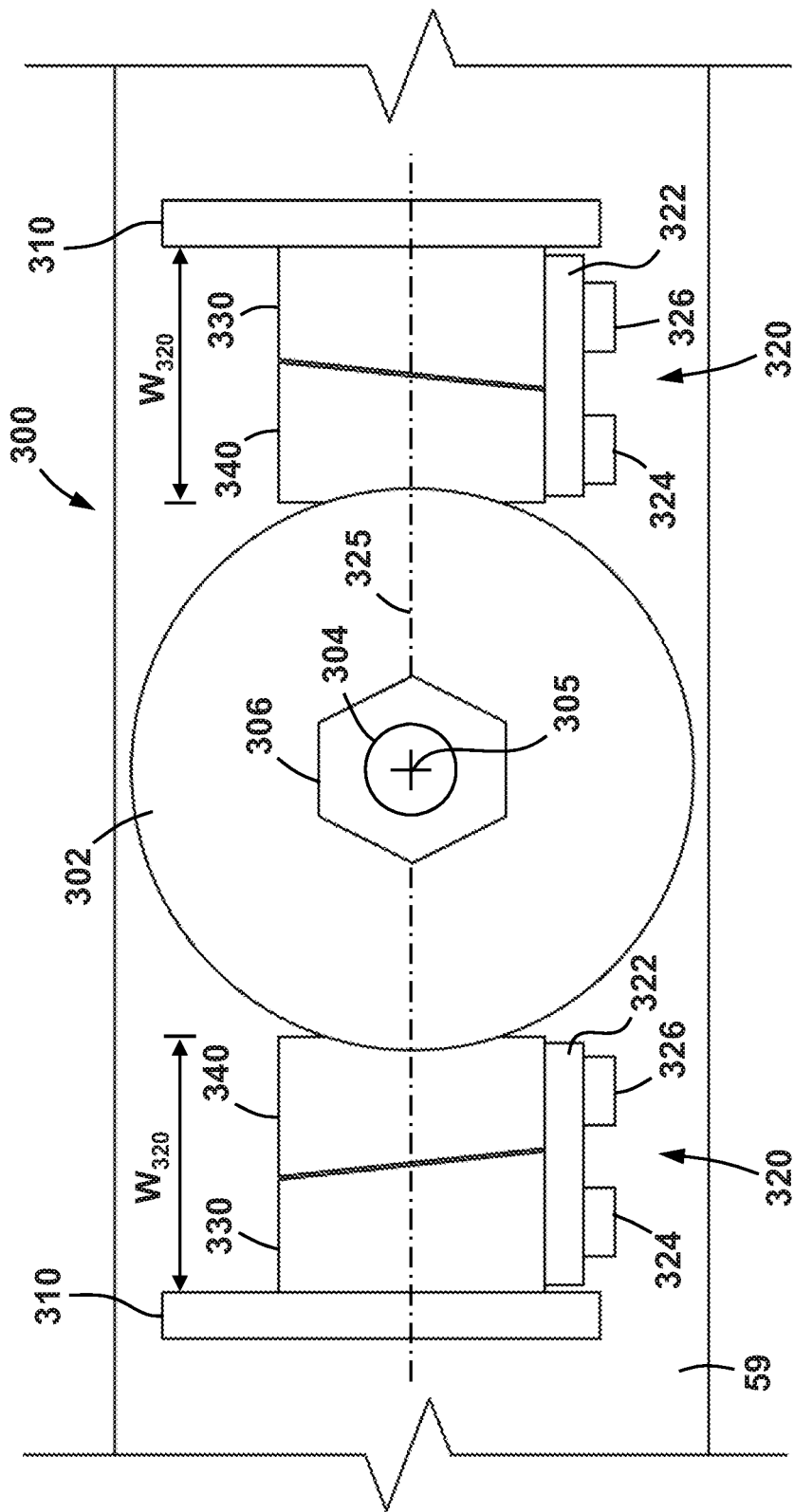
FIG. 14 is a schematic top view of the adjustment assembly of FIG. 13.

Referring now to FIG. 14, as previously described adjustment assembly 300 includes a plurality of wedge assemblies 320. In particular, in this embodiment, adjustment assembly includes two wedge assemblies 320. As will be described in more detail below, wedge assemblies 320 may be actuated to translate foot 302 and mounting plate 27 (see FIG. 13) along (or parallel to) an axis 325 that is orthogonal to axis 305. Thus, wedge assemblies 320 may be actuated to change or alter a radial position of mounting plate 27 and fluid end 26 with respect to rod axis 305. Each wedge assembly 320 includes a first wedge member 330 and a second wedge member 340 that are coupled to a washer plate 322.

Figure 15:
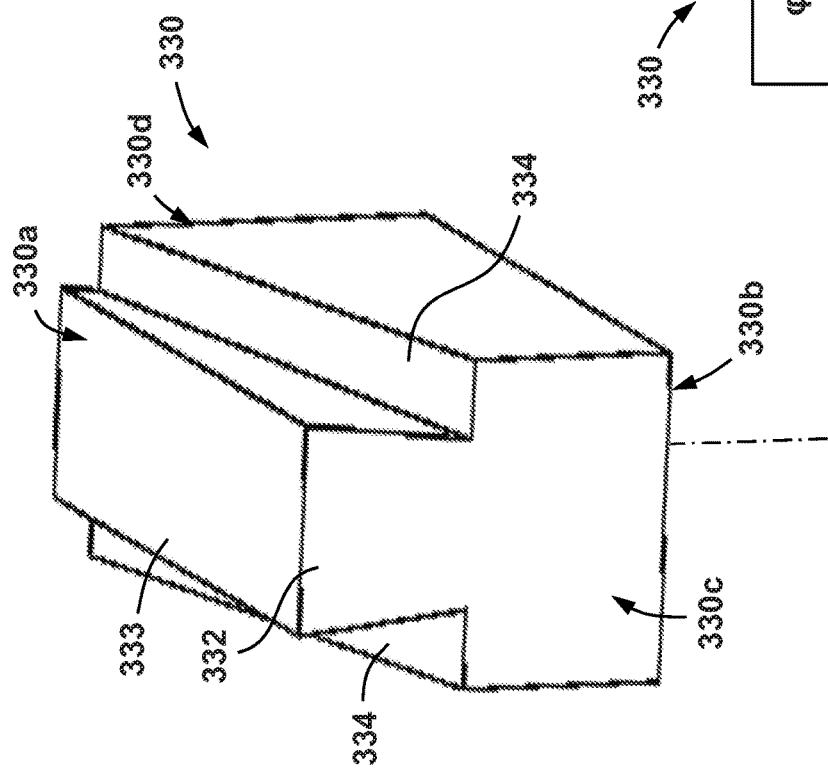
FIGS. 15 and 16 are perspective and side views, respectively, of a first of the wedge members of each of the wedge assemblies of the adjustment assembly of FIG. 13.
Figure 16:
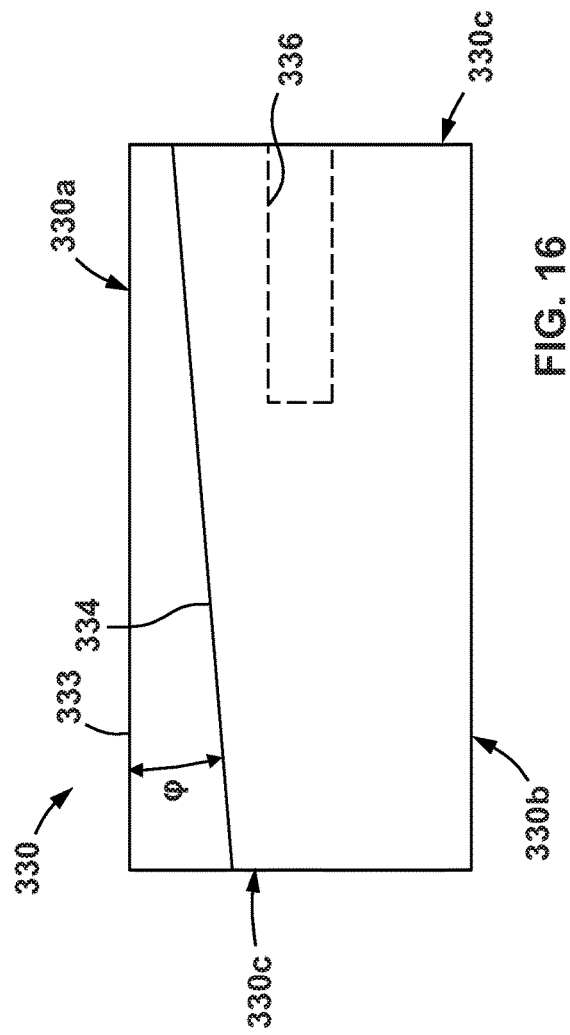

Referring now to FIGS. 15 and 16, one first wedge member 330 is shown, it being understood that each of the first wedge members 330 are configured the same. First wedge member 330 includes a first or inner side 330a, a second or outer side 330b opposite inner side 330a, a first end 330c extending between sides 330a, 330b, and a second end 330d opposite first end 330c that also extends between sides 330a, 330b. Inner side 330a includes a pair of planar surfaces 334 and a projection 332 extending from planar surfaces 334 that further includes a planar surface 333. Planar surfaces 334 each extend at an angle φ relative to the planar surface 333 of projection 332. The angle φ may be generally greater than 0° and less than 90°, and in some embodiments, the angle φ may range from 0 to 15°, or from 5 to 10°. In addition, as best shown in FIG. 16, a mounting aperture 336 extends into second end 330d of first wedge member 330. In this embodiment, mounting aperture 336 is tapped and thus includes a helical thread profile (not shown).

Referring now to FIGS. 17 and 18, one second wedge member 340 is shown, it being understood that each of the second wedge members 340 are configured the same. Second wedge member 340 includes a first or outer side 340a, a second or inner side 340b opposite outer side 340a, a first end 340c extending between sides 340a, 340b, and a second end 340d opposite first end 340c that also extends between sides 340a, 340b. Outer side 340a includes a pair of planar surfaces 343, and a recess 342 extending inward from planar surfaces 343. Recess 342 defines a planar surface 342 that extends at an angle ε to planar surfaces 343. In some embodiments, the angle ε may be greater than 0° and less than 90°, and in other embodiments may range from 0 to 15°, or from 5 to 10°. In addition, in this embodiment, the angle ε is substantially equal to the angle φ of first wedge member 330. However, in other embodiments, the angles ε and φ may not be equal.

Referring still to FIGS. 17 and 18, a recess 348 extends inward from inner side 340b that is defined (at least partially) by an arcuate surface 346. In this embodiment, arcuate surface 346 is a cylindrical surface; however, arcuate surface 346 may have other profiles or curvatures in other embodiments, such as, for example, ovoid, elliptical, hyperbolic, parabolic, etc. Further, as best shown in FIG. 18, a mounting aperture 349 extends into first end 340c of second wedge member 340. In this embodiment, mounting aperture 349 is tapped and thus includes a helical thread profile (not shown).

Figure 19:
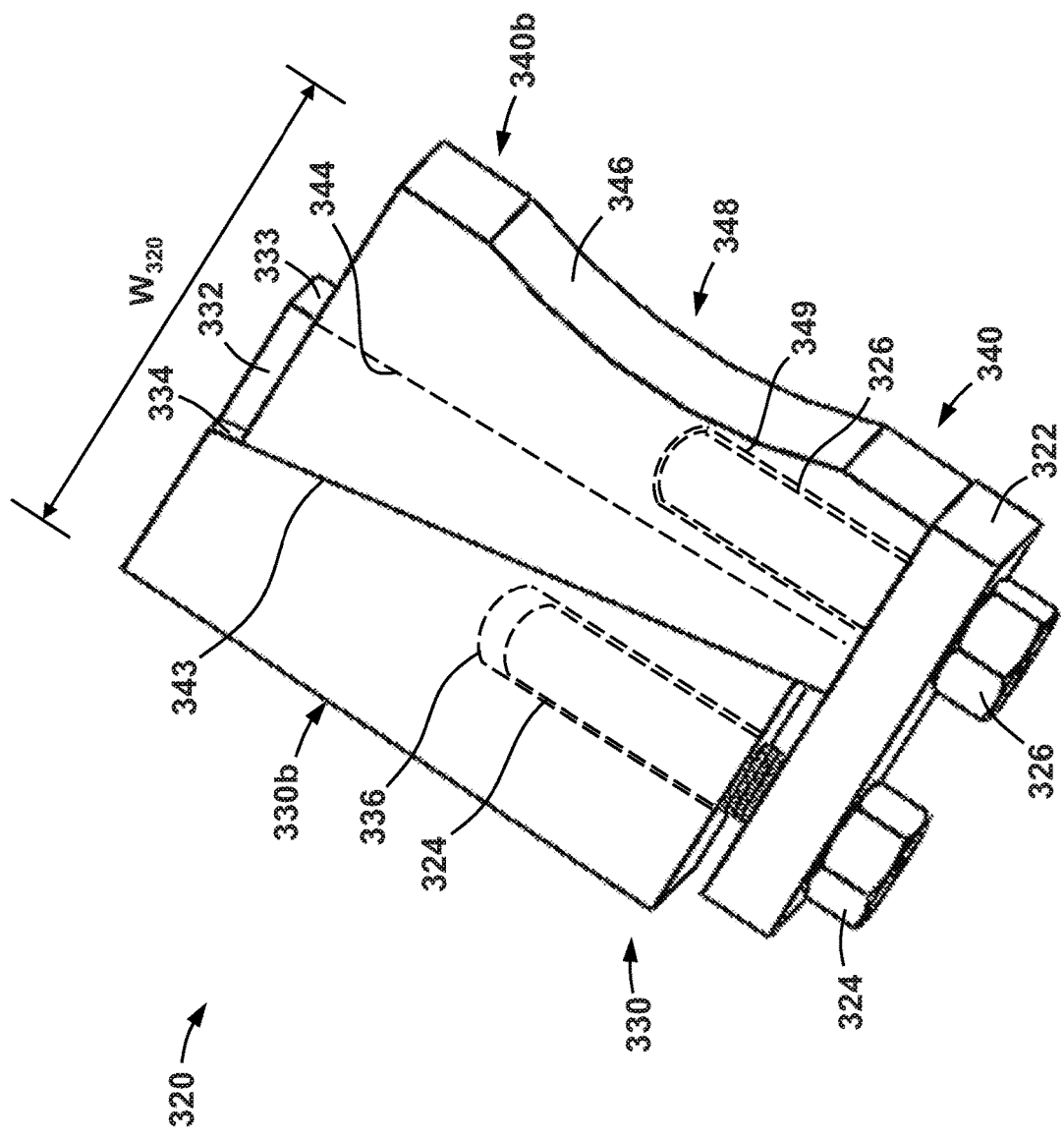
FIG. 19 is a perspective view of one of the wedge assemblies of FIG. 13.

Referring now to FIG. 19, the first and second wedge members 330 and 340, respectively, of each wedge assembly 320 are engaged with one another such that projection 332 is received within recess 342. As a result, planar surface 333 of first wedge member 330 is engaged with planar surface 344 of second wedge member 340. In addition, planar surfaces 334 of first wedge member 330 are engaged with planar surfaces 344 of second wedge member 340.

Washer plate 322 is secured to second wedge member 340 with a bolt 326 that extends through an aperture (not specifically shown) in washer plate 322 and is threadably engaged within tapped mounting aperture 349. In other embodiments, second wedge member 340 is secured to washer plate 322 without bolt 326, such as, for example via welding, rivets, integral machining or casting, etc. Another bolt 324 extends through a second aperture (not specifically shown) in washer plate 322 and is threadably engaged within tapped mounting aperture 336 of first wedge member 330.

When wedge assembly 320 is constructed as shown in FIG. 19, a width $W_{320}$ is defined that extends from outer side 330b of first wedge member 330 to inner side 340b of second wedge member 340. As will be described in more detail below, the width $W_{320}$ of wedge assembly 320 may be adjusted by selectively advancing and withdrawing bolt 324 into and from mounting aperture 336 to thereby actuate first wedge member 330 relative to second wedge member 340 and washer plate 322.

In particular, threaded advancement of bolt 324 within mounting aperture 336 (e.g., such as would correspond with tightening bolt 324 within aperture 336) progressively draws first wedge member 330 toward washer plate 322 along second wedge member 340. The relative movement of first wedge member 330 along second wedge member 340 causes sliding engagement of projection 332 of first wedge member 330 within recess 342 of second wedge member 340. This further results in sliding engagement between planar surface 333 and 344 of wedge members 330, 340, respectively, and sliding engagement between planar surfaces 334 and 343 of wedge members 330, 340, respectively. Because of the relative angle φ between surface 333 and planar surfaces 334 on first wedge member 330 and the relative angle ε between planar surfaces 344, 343 on second wedge member 340, the sliding engagement between wedge members 330, 340 as first wedge member 330 is drawn toward washer plate 322 relative to second wedge member 340 results in a reduction or decrease in the width $W_{320}$.

Referring still to FIG. 19, the threaded withdrawal of bolt 324 from mounting aperture 336 (e.g., such as would correspond with loosening bolt 324 within aperture 336) progressively forces first wedge member 330 away from washer plate 322 along second wedge member 340. This relative movement of first wedge member 330 along second wedge member 340 again causes sliding engagement of projection 332 of wedge member 330 within recess 342 of second wedge member 340 and sliding engagement between surfaces 333 and 334, and between surface 334 and 343 as previously described above. However, in the case where the first wedge member 330 is forced away from washer plate 322 relative along second wedge member 340, the above described sliding engagement between wedge members 330, 340 results in an increase in the width $W_{320}$.

Thus, by selectively advancing and withdrawing bolt 324 into and from, respectively, mounting aperture 336 on first wedge member 330, the width $W_{320}$ of wedge assembly 320 may be selectively increased and decreased, respectively. It should be appreciated that a similar selective adjustment in width $W_{320}$ may be achieved in other embodiments by fixing the first wedge member 330 to washer plate 322 (e.g., via bolt 324, rivets, welding, or any other suitable method), and selectively advancing and withdrawing bolt 326 within mounting aperture 349 of second wedge member 340. In still other embodiments, the relative positions of both wedge members 330, 340 to washer plate 322 may both be adjusted to achieve a desired adjustment in width $W_{320}$.

Referring back now to FIG. 14, each wedge assembly 320 is disposed on bracket 59 and is axially positioned between foot 302 and a support member 310 along axis 325. In this embodiment, support members 310 are plates that are welded to bracket 59, and thus, the positions of support members 310 are fixed along bracket 59 during operations. In embodiments where support bracket 59 is omitted, support members 310 may be secured to support extensions 58 or some other portion of frame 50 (see FIG. 2). Each wedge assembly 320 is disposed axially between one of the support members 310 and foot 302 along axis 325 so that outer side 330b of first wedge member 330 is engaged with support member 310 and arcuate surface 346 on inner side 340b of second wedge member 340 is engaged with foot 302. In this embodiment, the cylindrical curvature of arcuate surface 346 substantially matches or corresponds with the curvature of foot 302 such that there is surface contact (as opposed to line or point contact) between surface 346 and foot 302 during operations. In addition, in this embodiment each wedge assembly 320 is not directly secured to the surface of bracket 59. Rather, the engagement between the arcuate surface 346 and foot 302 generally prevents or restricts movement of wedge assembly 320 during operations. Further, in this embodiment, when wedge assemblies 320 are disposed on axially opposing side of foot 302 along axis 325 and between support members 310 as shown, the width $W_{320}$ of each wedge assembly 320 extends parallel to or is aligned with axis 325. Because axis 325 extends radially with respect to axis 305, width $W_{320}$ may be referred to herein as a "radial width," and wedge assemblies 320 may be described as being "radially" positioned between support members 310 and foot 302 with respect to axis 305.

Referring now to FIGS. 20 and 21, during operations, the width $W_{320}$ of each wedge assembly 320 may be selectively adjusted in the manner previously described above to selectively adjust the position of foot 302 (and thus also mounting plate 27 and fluid end 26) along axis 325. In particular, as shown in the sequence from FIGS. 20 to 21, the first wedge member 330 of the left-most wedge assembly 320 in FIGS. 20 and 21 is forced away from the corresponding washer plate 322 along the second wedge member 340 via axial withdrawal of bolt 324 from mounting aperture 336 as previously described above. As a result, the width $W_{320}$ of the left-most wedge assembly 320 is increased in the sequence from FIGS. 20 to 21.

Conversely, as is also shown in the sequence from FIGS. 20 to 21, the first wedge member 330 of the right-most wedge assembly 320 in FIGS. 20 and 21 is drawn toward the corresponding washer plate 322 along second wedge member 340 via axial advancement of bolt 324 within mounting aperture 335 as previously described above. As a result, the width $W_{320}$ of the right-most wedge assembly 320 is decreased in the sequence from FIGS. 20 to 21.

Referring still to FIGS. 20 and 21, the simultaneous increase in width $W_{320}$ of the left-most wedge assembly 320 and decrease in width $W_{320}$ of the right-most wedge assembly 320 ultimately results in a movement of foot 302 along axis toward the right in FIGS. 20 and 21. Thus, through selective adjustments in the widths $W_{320}$ of wedge assemblies 320, the lateral position of foot 302 may be selectively changed or adjusted along bracket 59. Because foot 302 is secured to mounting plate 27 and fluid end 26 as previously described (see FIG. 13), the movement of foot 302 along axis 325 also causes a corresponding axial movement of mounting plate 27 and fluid end 26 with respect to axis 325. Further, as previously described, in this embodiment, axis 305 is aligned (or substantially aligned) with the vertical direction (e.g., along the force of gravity). Thus, because axis 325 is orthogonal to axis 305, in these embodiments, axis 325 is aligned with the horizontal or lateral direction (with regard to the direction of the force of gravity).

Embodiments disclosed herein have included modular pump assemblies for pressurizing a working fluid (e.g., pumping assembly 20) that include a plurality of adjustable connectors and assemblies (e.g., connectors 100, adjustment assembly 300, etc.) that allow for proper alignment between modular components of the pumping assembly (e.g., fluid end 26 and transmission 24). Accordingly, through use of the embodiments disclosed herein, the assembly and use of a modular pump assembly at an industrial worksite may be more practically facilitated, thereby increasing reliability and reducing costs for the use of such systems.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A pump assembly for pressurizing a working fluid, the pump assembly comprising:
   a frame;
   a fluid end;
   a power end coupled to the frame and the fluid end; and
   a plurality of connectors coupled between the fluid end and the frame, wherein each of the connectors comprises:
      an axis;
      a first connector member; and
      a second connector member;
      wherein the first connector member is configured to translate relative to the second connector member in a direction extending orthogonal to the axis to adjust a total axial length of the connector along the axis.

2. The pump assembly of claim 1, wherein for each connector:
   the first connector member comprises a first inclined surface;
   the second connector member comprises a second inclined surface; and
   the first inclined surface is configured to slidingly engage the second inclined surface to adjust the total axial length.

3. The pump assembly of claim 2, wherein for each connector, the first connector member is configured to actuate radially relative to the second connector member with respect to the axis to slidingly engage the first inclined surface with the second inclined surface.

4. The pump assembly of claim 1, wherein the fluid end includes a mounting plate that is coupled to the frame through the plurality of connectors, and wherein for each connector, a bolt extends through the mounting plate, the first connector member, and the second connector member along the axis.

5. The pump assembly of claim 3, wherein each connector further comprises an adjustment member threadably engaged within a bore of the first connector member, wherein the adjustment member comprises a radially extending threaded fastener configured to be threadably advanced or withdrawn into or from, respectively, the bore of the first connector member to radially actuate the first connector member relative to the second connector member.

6. The pump assembly of claim 1, further comprising an adjustment assembly coupled to the fluid end, wherein the adjustment assembly comprises:
   a foot configured to engage with a support surface;
   an engagement rod having a rod axis, wherein the engagement rod is coupled to the foot and is threadably coupled to a mounting plate of the fluid end;
   wherein a threaded advance or withdrawal of the engagement rod into or from, respectively, the mounting plate is configured to displace the fluid end along the rod axis.

7. The pump assembly of claim 6, wherein the adjustment assembly further comprises a wedge assembly, wherein the wedge assembly comprises:
   a first wedge member; and
   a second wedge member engaged with the first wedge member;

wherein the first wedge member and the second wedge member are radially disposed between a support member coupled to the frame and the foot, with respect to the rod axis; and wherein the first wedge member is configured to actuate relative to the second wedge member to adjust a total radial width of the wedge assembly with respect to the rod axis.

8. A pumping system for pressurizing a working a fluid, the pumping system comprising:
  a suction manifold;
  a discharge manifold;
  a plurality of pump assemblies coupled between the suction manifold and the discharge manifold, wherein each of the plurality of pump assemblies comprises:
    a frame;
    a fluid end;
    a power end coupled to the frame and the fluid end; and
    a plurality of connectors coupled between the fluid end and the frame, wherein each of the connectors comprises:
      an axis;
      a first connector member; and
      a second connector member;
      wherein the first connector member is configured to translate relative to the second connector member in a direction extending orthogonal to the axis to adjust a total axial length of the connector along the axis.

9. The pumping system of claim 8, wherein for each connector:
  the first connector member comprises a first inclined surface;
  the second connector member comprises a second inclined surface; and
  the first inclined surface is configured to slidingly engage the second inclined surface to adjust the total axial length.

10. The pumping system of claim 9, wherein the for each connector, the first connector member is configured to actuate radially relative to the second connector member with respect to the axis to slidingly engage the first inclined surface with the second inclined surface.

11. The pumping system of claim 8, wherein for each pump assembly, the fluid end includes a mounting plate that is coupled to the frame through the plurality of connectors, and wherein for each connector, a bolt extends through the mounting plate, the first connector member, and the second connector member along the axis.

12. The pumping system of claim 11, wherein each connector further comprises an adjustment member threadably engaged within a bore of the first connector member, wherein the adjustment member comprises a radially extending threaded fastener configured to be threadably advanced or withdrawn into or from, respectively, the bore of the first connector member to radially actuate the first connector member relative to the second connector member.

13. The pump assembly of claim 12, wherein each connector further comprises a washer plate comprising an aperture, wherein the adjustment member extends radially through the aperture with respect to the axis.

14. The pump assembly of claim 13, further comprising an adjustment assembly coupled to the fluid end, wherein the adjustment assembly comprises:
  a foot configured to engage with a support surface;
  an engagement rod having a rod axis, wherein the engagement rod is coupled to the foot and is threadably coupled to the mounting plate, and wherein a threaded advance or withdrawal of the engagement rod into or from, respectively, the mounting plate is configured to actuate the fluid end; and
  a wedge assembly comprising:
    a first wedge member; and
    a second wedge member engaged with the first wedge member;
    wherein the first wedge member and the second wedge member are radially disposed between a support member coupled to the frame and the foot with respect to the rod axis; and
    wherein the first wedge member is configured to actuate relative to the second wedge member to adjust a total radial width of the wedge assembly with respect to the rod axis.

15. A method, comprising:
  (a) coupling a power end of a pump assembly to a transmission;
  (b) coupling the transmission to a fluid end of the pump assembly and coupling the fluid end to a frame supporting the transmission with a plurality of connectors, wherein each connector comprises an axis; and
  (c) adjusting a total axial length of at least one of the connectors to adjust an alignment of the fluid end relative to the transmission.

16. The method of claim 15, wherein each connector comprises a first connector member and a second connector member axially adjacent one another along the axis; and
  wherein (c) comprises actuating the first connector member radially relative to the second connector member for the a least one of the connectors.

17. The method of claim 16, wherein for each connector, the first connector member comprises a first inclined surface and the second connector member comprises a second inclined surface, and
  wherein (c) comprises slidingly engaging the first inclined surface with the second inclined surface for the at least one of the connectors.

18. The method of claim 17, wherein for each connector, an adjustment member is threadably received within a bore of the first connector member, and
  wherein (c) comprises threadably advancing or threadably withdrawing the adjustment member into or from, respectively, the bore of the first connector member.

19. The method of claim 18, wherein (b) comprises coupling a mounting plate engaged with the fluid end to a frame supporting the transmission; and
  wherein each connector further comprises a bolt extending through the mounting plate, the first connector member, and the second connector member along the axis.

20. The method of claim 19, further comprising:
  (d) coupling a foot to an end of an engagement rod, the engagement rod extending along a rod axis;
  (e) engaging the foot with a support surface;
  (f) threadably advancing or threadably withdrawing the engagement rod along the rod axis into or from, respectively, a bore in the mounting plate;
  (g) adjusting an axial position of the fluid end with respect to the rod axis during (f);
  (h) placing a wedge assembly radially between a support member coupled to a frame of the pump assembly and the foot with respect to the rod axis; and (i) adjusting a radial width of wedge assembly to adjust a radial position of the fluid end with respect to the rod axis during.

\* \* \* \* \*